US010088223B2

(12) United States Patent
Roullett

(10) Patent No.: US 10,088,223 B2
(45) Date of Patent: Oct. 2, 2018

(54) CHEST FREEZER ORGANIZER

(71) Applicant: Floral Ann Roullett, Hobart, IN (US)

(72) Inventor: Floral Ann Roullett, Hobart, IN (US)

( * ) Notice: Subject to any disclaimer, the term of this patent is extended or adjusted under 35 U.S.C. 154(b) by 0 days.

(21) Appl. No.: 15/785,005

(22) Filed: Oct. 16, 2017

(65) Prior Publication Data

US 2018/0038629 A1 Feb. 8, 2018

Related U.S. Application Data

(63) Continuation of application No. 14/708,563, filed on May 11, 2015.

(60) Provisional application No. 61/992,428, filed on May 13, 2014.

(51) Int. Cl.
*F25D 25/02* (2006.01)
*F16M 11/28* (2006.01)
*F25D 25/04* (2006.01)

(52) U.S. Cl.
CPC ........... *F25D 25/022* (2013.01); *F16M 11/28* (2013.01); *F25D 25/024* (2013.01); *F25D 25/027* (2013.01); *F25D 25/04* (2013.01)

(58) Field of Classification Search
CPC .... F25D 25/022; F25D 25/027; F25D 25/024; F16M 11/28
USPC .......... 211/129.1, 131.1, 144, 163, 168, 150, 211/174, 80, 81, 110, 165, 199, 56, 58, 211/77, 78; 248/125.7, 125.8, 311.2; 220/475, 23.83, 23.86; 312/305, 125, 312/136; 206/558
See application file for complete search history.

(56) References Cited

U.S. PATENT DOCUMENTS 554,661 A * 2/1896 Doolittle ................ A47G 7/041 108/105
1,385,274 A * 7/1921 Rhodes ................... F25D 3/045 217/129
1,576,716 A * 3/1926 Casgrain ............ A43D 111/006 108/94
1,661,787 A * 3/1928 Chisholm .............. A47G 21/14 211/70.7
1,719,966 A * 7/1929 Burns .................. A47B 21/045 211/110
2,080,885 A * 5/1937 Cocks ........................ F25D 3/06 220/DIG. 8
(Continued)

*Primary Examiner* — Jonathan Liu
*Assistant Examiner* — Devin K Barnett
(74) *Attorney, Agent, or Firm* — Hartman Global IP Law; Gary M. Hartman; Domenica N. S. Hartman

(57) ABSTRACT

Organizers for chest freezers are disclosed that provide increased access to items in chest freezers. The organizers include a base and at least one storage member, which can move vertically and rotate horizontally relative to the base. Vertical and horizontal movement of the storage member relative to the base is provided in some embodiments by a vertical member that forms a hinge between the base and the storage member and is provided in some embodiments by a coupling of the storage member to a vertical member extending vertically from the base. Also disclosed is a corresponding method for accessing items in a chest freezer. Moving a storage member of a disclosed organizer up relative to the organizer's base and/or rotating the storage member horizontally relative to the base provides greater access to frozen items in the storage member and frozen items located below the storage member's original position.

14 Claims, 26 Drawing Sheets

(56) References Cited

U.S. PATENT DOCUMENTS

| | | | | | |
|---|---|---|---|---|---|
| 2,092,430 | A | * | 9/1937 | Stratton | F25D 25/027 108/110 |
| 2,136,843 | A | * | 11/1938 | Dinkel | A47B 67/005 132/314 |
| 2,155,284 | A | * | 4/1939 | Steenstrup | F25D 25/021 211/181.1 |
| 2,398,091 | A | * | 4/1946 | Gluckman | A47B 21/045 211/129.1 |
| D147,482 | S | * | 9/1947 | Winterfeld | 206/565 |
| RE23,374 | E | * | 6/1951 | Ramsey | F25D 25/027 126/338 |
| 2,746,830 | A | * | 5/1956 | Fonda | F25D 25/027 312/270.1 |
| 2,752,761 | A | * | 7/1956 | Lewis, Jr. | F25D 23/04 312/199 |
| 2,795,474 | A | * | 6/1957 | Carbary | F25D 25/027 312/270.1 |
| 2,830,864 | A | * | 4/1958 | Pulaski | F25D 25/027 211/150 |
| 2,831,582 | A | * | 4/1958 | Cody | A47B 49/004 108/141 |
| 2,836,305 | A | * | 5/1958 | Davey | F25D 25/027 108/138 |
| 2,840,438 | A | * | 6/1958 | Sharpe | F25D 25/027 126/338 |
| 2,955,892 | A | * | 10/1960 | Pulaski | A47B 49/004 211/150 |
| 3,063,775 | A | * | 11/1962 | Snowman | F25D 25/027 108/141 |
| 3,091,343 | A | * | 5/1963 | Neumann | A47J 47/16 126/25 R |
| 3,167,186 | A | * | 1/1965 | Squire | F25D 25/027 108/141 |
| 3,172,715 | A | * | 3/1965 | Powder | F25D 25/027 108/106 |
| 3,188,157 | A | * | 6/1965 | Rand | A45D 33/00 220/23.8 |
| 3,216,775 | A | * | 11/1965 | Brenner | F25D 25/027 108/20 |
| 3,392,868 | A | * | 7/1968 | Pfrommer | A45D 33/22 220/4.27 |
| 3,410,109 | A | * | 11/1968 | Maryland | F25D 3/107 62/457.9 |
| 3,498,471 | A | * | 3/1970 | Dirkx | A47B 21/045 211/131.1 |
| 4,085,987 | A | * | 4/1978 | Vartdal | A01K 97/06 206/315.11 |
| D256,587 | S | * | 8/1980 | Tatsumi | D15/83 |
| 4,239,308 | A | * | 12/1980 | Bradley | A45C 11/16 312/201 |
| D267,153 | S | * | 12/1982 | Lebowitz | D19/75 |
| D280,739 | S | * | 9/1985 | Wang | D19/77 |
| 4,551,988 | A | * | 11/1985 | Petrantoni | F25D 3/06 62/457.1 |
| 4,762,237 | A | * | 8/1988 | Newton | A47B 49/004 211/115 |
| 4,815,483 | A | * | 3/1989 | DuGrenier | A45D 33/00 132/295 |
| 4,896,785 | A | * | 1/1990 | Sodervall | A47F 3/0434 220/377 |
| 4,971,234 | A | * | 11/1990 | Hay | B25H 3/025 211/131.1 |
| 4,999,943 | A | * | 3/1991 | Crabtree | A01K 97/06 43/54.1 |
| 5,205,429 | A | * | 4/1993 | Woolworth | B25H 3/027 190/33 |
| 5,458,243 | A | * | 10/1995 | McBride | A47B 57/30 206/503 |
| 5,735,413 | A | * | 4/1998 | Allen | A47B 46/00 211/107 |
| 5,797,279 | A | * | 8/1998 | Osborne | F25D 11/02 62/381 |
| 5,799,787 | A | * | 9/1998 | Talbot | B25H 3/025 206/315.11 |
| D422,443 | S | * | 4/2000 | De Limur | D6/406.2 |
| D477,337 | S | * | 7/2003 | Jiang | D15/85 |
| 6,626,306 | B1 | * | 9/2003 | Bell | A47B 46/00 211/133.4 |
| 6,648,390 | B1 | * | 11/2003 | Yang | A47B 49/00 206/821 |
| 6,705,655 | B2 | * | 3/2004 | Yang | A47B 49/00 206/821 |
| 6,883,887 | B1 | * | 4/2005 | Mogensen | A47B 49/004 312/305 |
| D505,548 | S | * | 5/2005 | Yang | D3/282 |
| 6,948,626 | B1 | * | 9/2005 | Duncan | A47J 47/16 211/70.7 |
| D510,953 | S | * | 10/2005 | Chen | D19/77 |
| 6,969,132 | B1 | * | 11/2005 | Viville | A47B 31/02 211/1.3 |
| D535,477 | S | * | 1/2007 | Nguy | D3/276 |
| 7,584,973 | B2 | * | 9/2009 | Brager | B25H 3/026 108/141 |
| 7,967,355 | B2 | * | 6/2011 | Lin | B25H 3/025 206/372 |
| D687,680 | S | * | 8/2013 | Betesh | D7/600.4 |
| D693,154 | S | * | 11/2013 | Hertaus | D6/668.1 |
| 8,915,391 | B2 | * | 12/2014 | Radow | A47G 19/00 108/139 |
| 8,985,367 | B2 | * | 3/2015 | Kim | A45D 19/00 206/581 |
| 2005/0035120 | A1 | * | 2/2005 | Hull | A45C 11/20 220/23.87 |
| 2007/0033858 | A1 | * | 2/2007 | Marino | A01K 97/06 43/54.1 |
| 2007/0102381 | A1 | * | 5/2007 | Nguy | B25H 3/025 211/70.6 |
| 2008/0041799 | A1 | * | 2/2008 | Nguy | B25H 3/023 211/70.6 |
| 2009/0020489 | A1 | * | 1/2009 | Lin | B25H 3/025 211/88.01 |
| 2009/0315439 | A1 | * | 12/2009 | Turner | F25D 25/022 312/404 |
| 2010/0231105 | A1 | * | 9/2010 | Latif | A47B 46/005 312/293.1 |
| 2011/0089128 | A1 | * | 4/2011 | Jin | A01N 1/0242 211/163 |
| 2012/0211499 | A1 | * | 8/2012 | Clement | A01K 97/20 220/592.2 |
| 2013/0257255 | A1 | * | 10/2013 | Hwang | F25D 23/02 312/404 |
| 2014/0014603 | A1 | * | 1/2014 | Thompson | A47F 5/02 211/78 |
| 2015/0330701 | A1 | * | 11/2015 | Roullett | F25D 25/022 211/85.4 |
| 2016/0061513 | A1 | * | 3/2016 | Gossens | A47F 3/0426 312/405 |

* cited by examiner

CHEST FREEZER ORGANIZER

CROSS-REFERENCE TO RELATED APPLICATIONS

This application is a Continuation-in-Part Application of U.S. Non-Provisional application Ser. No. 14/708,563 “Chest Freezer Organizer” to Floral Ann Roullett, filed May 11, 2015, which claims the benefit of U.S. Provisional Application No. 61/992,428 “Chest Freezer Organizer” to Floral Ann Roulett, filed May 13, 2014, the disclosure of which is expressly incorporated by reference herein.

FIELD OF THE DISCLOSURE

The present disclosure generally relates to a device and method for organizing and/or storing items, and more particularly to a device and method for organizing and/or storing items within a chest freezer.

SUMMARY OF THE DISCLOSURE

Chest freezers are often deep. As a result, accessing items located in the middle or bottom of a chest freezer may be challenging. Devices exist to aid in accessing these items.

Accordingly, in one embodiment, the present disclosure provides A chest freezer assembly including a chest freezer having a body and a lid. The body and lid defining an interior region divided into four quadrants. The lid is coupled to the body to rotate about a horizontal axis of rotation positioned adjacent a back of the body of the chest freezer between a shut, lowered position and a raised, open position. The assembly further includes a chest freezer organizer positioned in the interior region, the chest freezer organizer has a base; at least one storage member having a frozen item positioned therein; and at least one vertical member positioned in a first quadrant of the interior region and away from the remaining three quadrants of the interior region. The at least one vertical member rotatably supports the at least one storage member to allow the at least one storage member to move vertically relative to the base and rotate relative to the base to increase access to at least one frozen item positioned under the at least one storage member.

According to another embodiment of the present disclosure, a chest freezer assembly is provided including a chest freezer having a body and a lid sized to completely cover the body. The lid is coupled to the body to rotate about a horizontal axis of rotation positioned adjacent to a back of the body of the chest freezer between a shut, lowered position and a raised, open position. The assembly further includes a chest freezer organizer positioned in the interior region of the body of the chest freezer. The chest freezer organizer has a base; at least one storage member having a frozen item positioned therein; and at least one vertical member coupled to the at least one storage member, the at least one storage member being movable vertically relative to the base to rotate horizontally to increase access to the at least one frozen item positioned under the at least one storage member.

Additional embodiments, as well as features and advantages of embodiments of the disclosure, will be apparent from the descriptions herein.

DETAILED DESCRIPTION

Chest freezers present an issue of how to access items stored underneath other items in the freezer. The present disclosure contemplates devices and methods for organizing items in chest freezers. The devices and methods disclosed provide greater and/or easier access to items stored in a chest freezer, including items stored on top of other items within the freezer and items stored under other items within the freezer.

Figure 1:
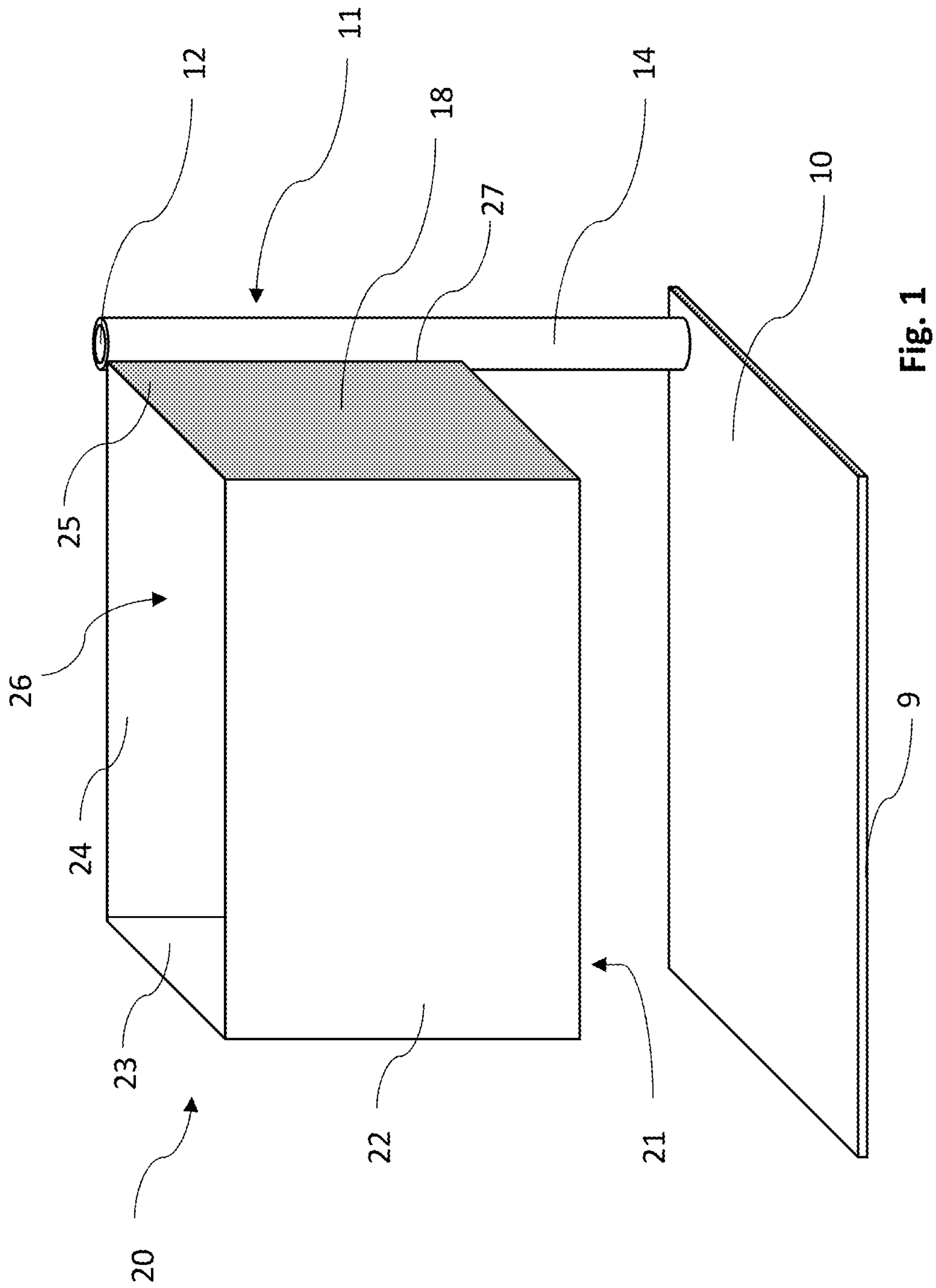
FIG. 1 is a perspective view of an exemplary organizer with one storage member showing a hinge positioned between the storage member and a base of the organizer.
Figure 2:
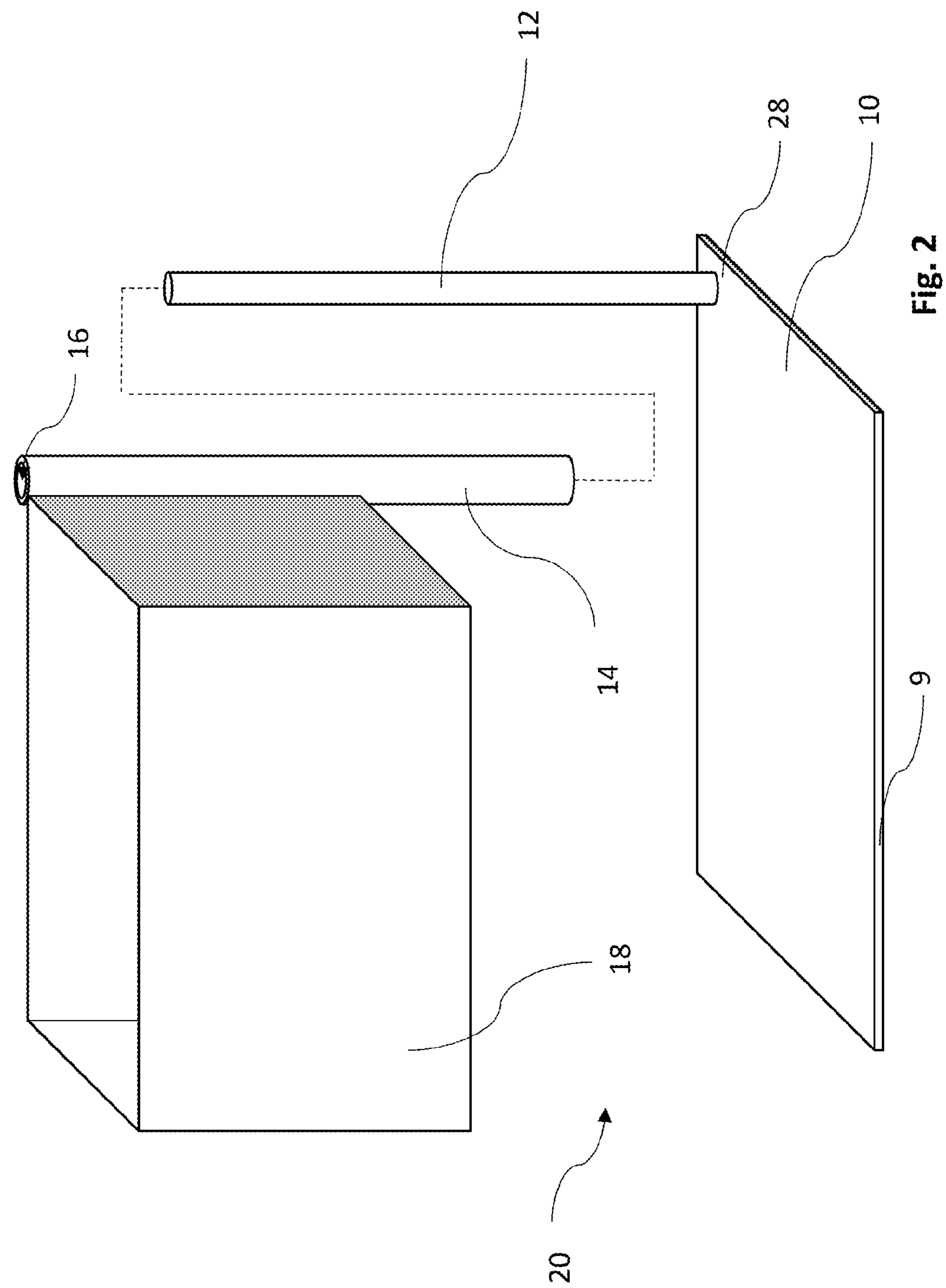
FIG. 2 is an exploded view of the exemplary organizer of FIG. 1 showing the hinge dissembled such that the storage member and the base are unconnected.

Referring to FIG. 1, an exemplary organizer 20 is provided. Organizer 20 includes a base 10, a storage member 18, a vertical member 12, and a coupling member 14. Base 10 and storage member 18 are both polygon-shaped. Base 10 includes a floor 9. Storage member 18 includes a floor 21 (not shown) and walls 22, 23, 24, 25 to define an interior space/region 26 to store frozen items. As illustrated in FIG. 2, vertical member 12 extends vertically from a corner 28 of base 10 and is received in an aperture 16 formed in coupling member 14. Coupling member 14 is supported on a corner 27 of storage member 18. In other instances, vertical member 12 can extend from a part of base 10 that is not a corner, coupling member 14 can be supported on a part of storage member 18 that is not a corner, and base 10 and/or storage member 18 can be shaped as to not have corners.

Aperture 16 is sized to receive vertical member 12. In this embodiment, coupling member 14 is a hollow pole or tube and aperture 16 is a circular bore extending through coupling member 14. In other embodiments, coupling member 14 can be, for example, a clamp, pulley, ring, partial ring, key-stock, or non-rigid member (e.g., elastic member, string, or wire), etc. and aperture 16 can be, for example, a hole, opening, gap, slot, etc. Aperture 16 can extend completely through or only partially through coupling member 14. In this embodiment, vertical member 12 is a circular support pole. In other embodiments, vertical member 12 can be, for example, a pole of different shape, a wall, or a non-rigid member (e.g., string or wire).

Figure 3:
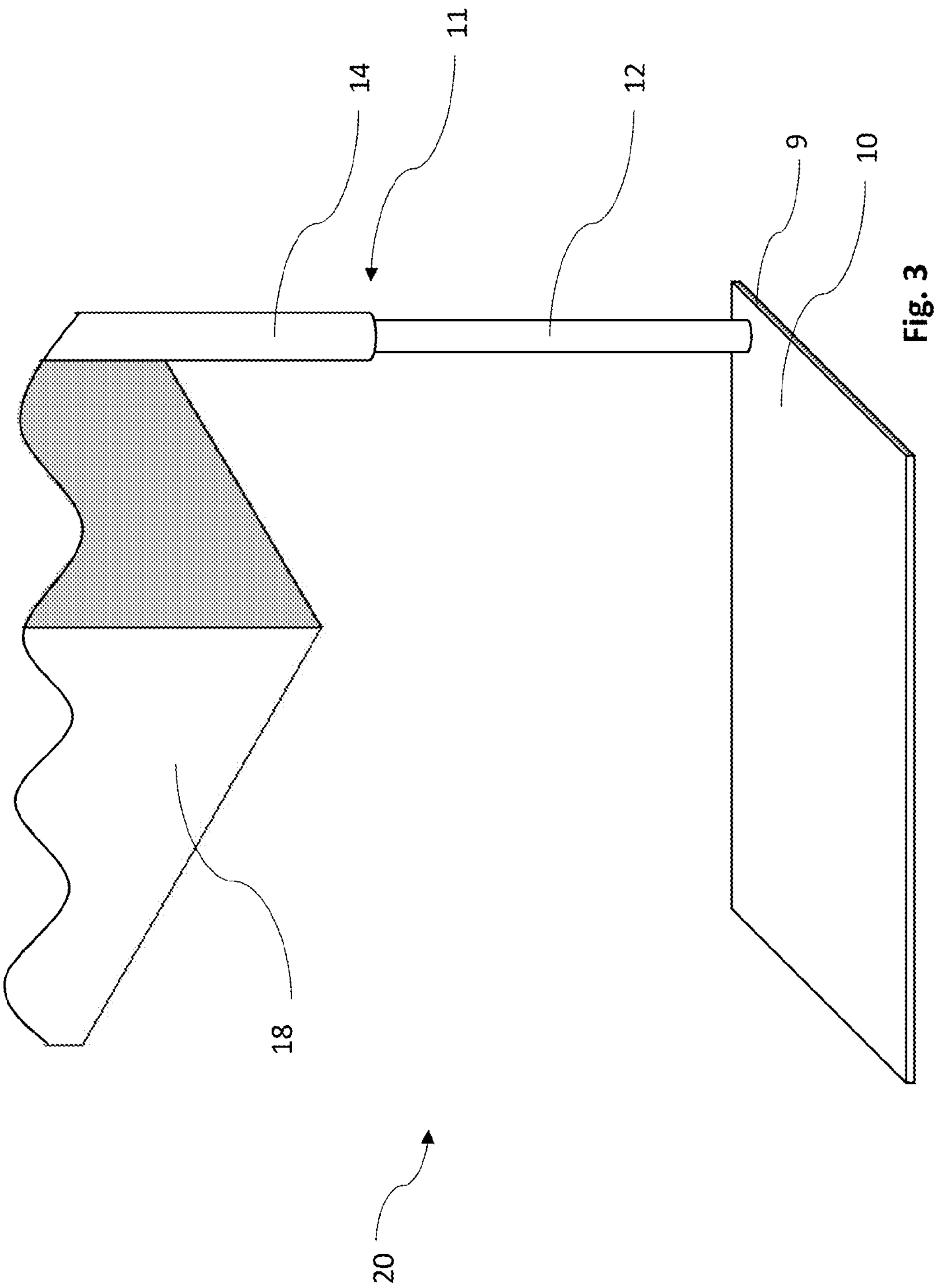
FIG. 3 is a perspective view of the exemplary organizer of FIG. 1 showing the storage member raised vertically and rotated horizontally relative to the base.

Together, vertical member 12, coupling member 14, and aperture 16 form a preferred embodiment hinge 11 between base 10 and storage member 18 that rotatably supports storage member 18 such that storage member 18 can slide up relative to base 10 and rotate relative to base 10. This allows increased access to frozen items, such as frozen food, that are positioned in storage member 18 or positioned above base 10 but under where storage member 18 is positioned in FIG. 1. Coupling member 14 couples storage member 18 to vertical member 12 such that storage member 18 can slide vertically relative to base 10 and rotate horizontally relative to base 10. Compared to the vertical height and horizontal orientation of storage member 18 relative to base 10 in FIG. 1, FIG. 3 shows storage member 18 both raised vertically and rotated horizontally relative to base 10.

When storage member 18 is at a lowest vertical position relative to base 10, a space is provided between storage member 18 and base 10 by coupling member 14. This space is provided by coupling member 14 extending below the bottom or floor 21 (not shown) of storage member 18 and is abutted from below, specifically by base 10, at a certain position such that coupling member 14 and thus storage member 18, on which coupling member 14 is supported, cannot slide further vertically downward, and at that certain position, a space exists between the bottom or floor 21 (not shown) of storage member 18 and base 10.

Figure 4:
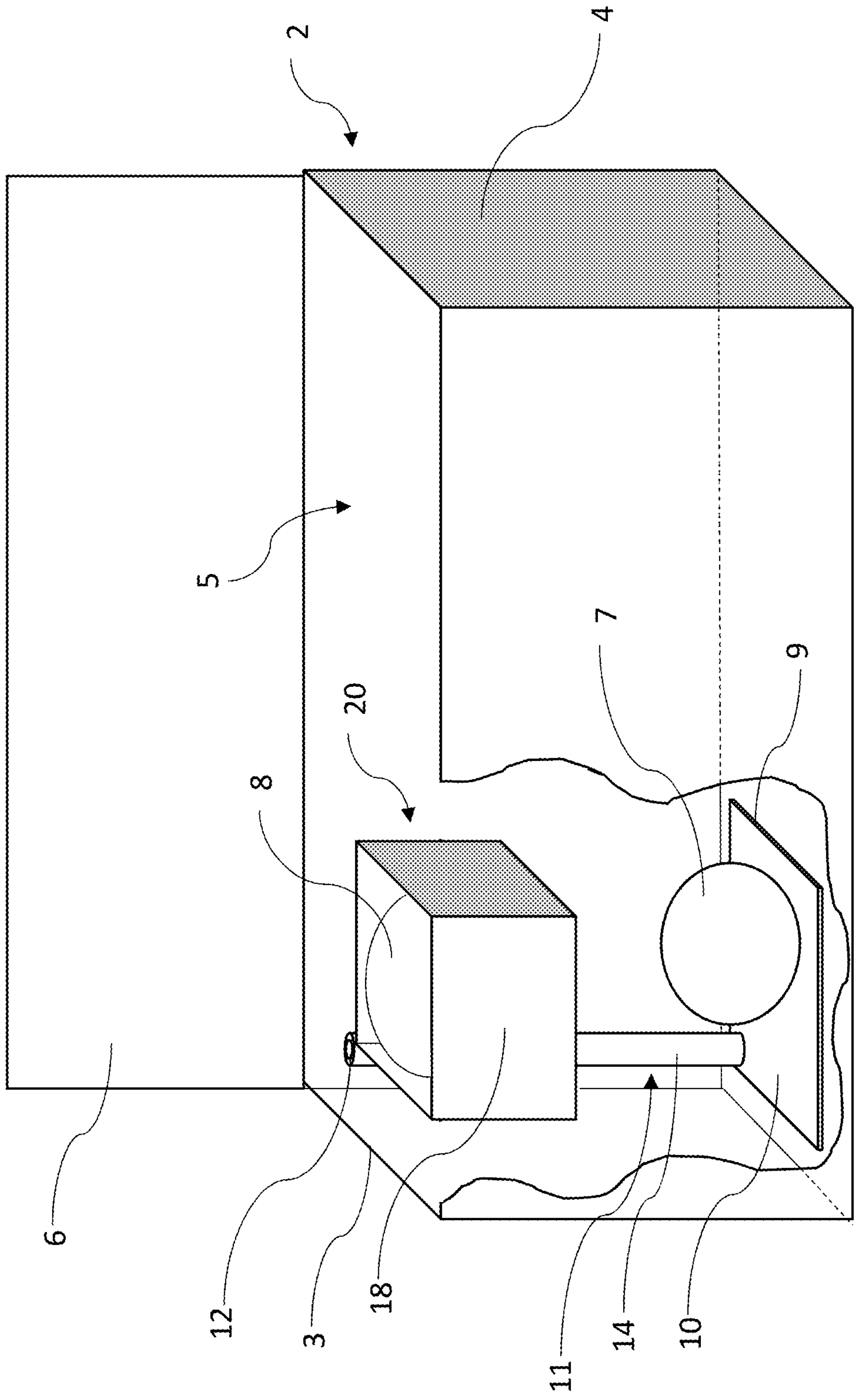
FIG. 4 is a perspective view of an exemplary organizer positioned within a chest freezer, part of which is removed such that the organizer is visible within the chest freezer.

Referring to FIG. 4, chest freezer 2 is an exemplary top-opening chest freezer having body 4 and lid 6 that define an interior space 5 sized to receive frozen items 7, 8. In some embodiments, lid 6 is restricted from rotating more than 90 degrees from its shut, lowered position to the raised, open position and will not rotate beyond the raised, open position.

Positioned within chest freezer 2 is organizer 20. A section of body 4 of chest freezer 2 is cut away such that organizer 20 is visible within chest freezer 2. Exemplary frozen item 8 is stored in organizer 20 within interior space 5 of storage member 18, and exemplary frozen item 7 is stored in organizer 20 on base 10 such that frozen item 7 is below storage member 18 when storage member 18 is at a lowest vertical position relative to base 10.

Though chest freezer 2 is shown with one particular set of dimensions for height, width, and depth, it is contemplated that embodiments of the present disclosure will fit inside chest freezers of all shapes and sizes. Embodiments of the disclosure can be made to fit and/or fill the interior space of chest freezers of different shapes and sizes by, for example, varying the size of an organizer's parts, varying the number of storage members supported by an organizer, and/or varying the number of organizers positioned within a particular chest freezer. For example, storage member 18 and, more generally, organizer 20 can be adjustable in size to allow for configuration for use in a wide variety of chest freezers.

Figure 5:
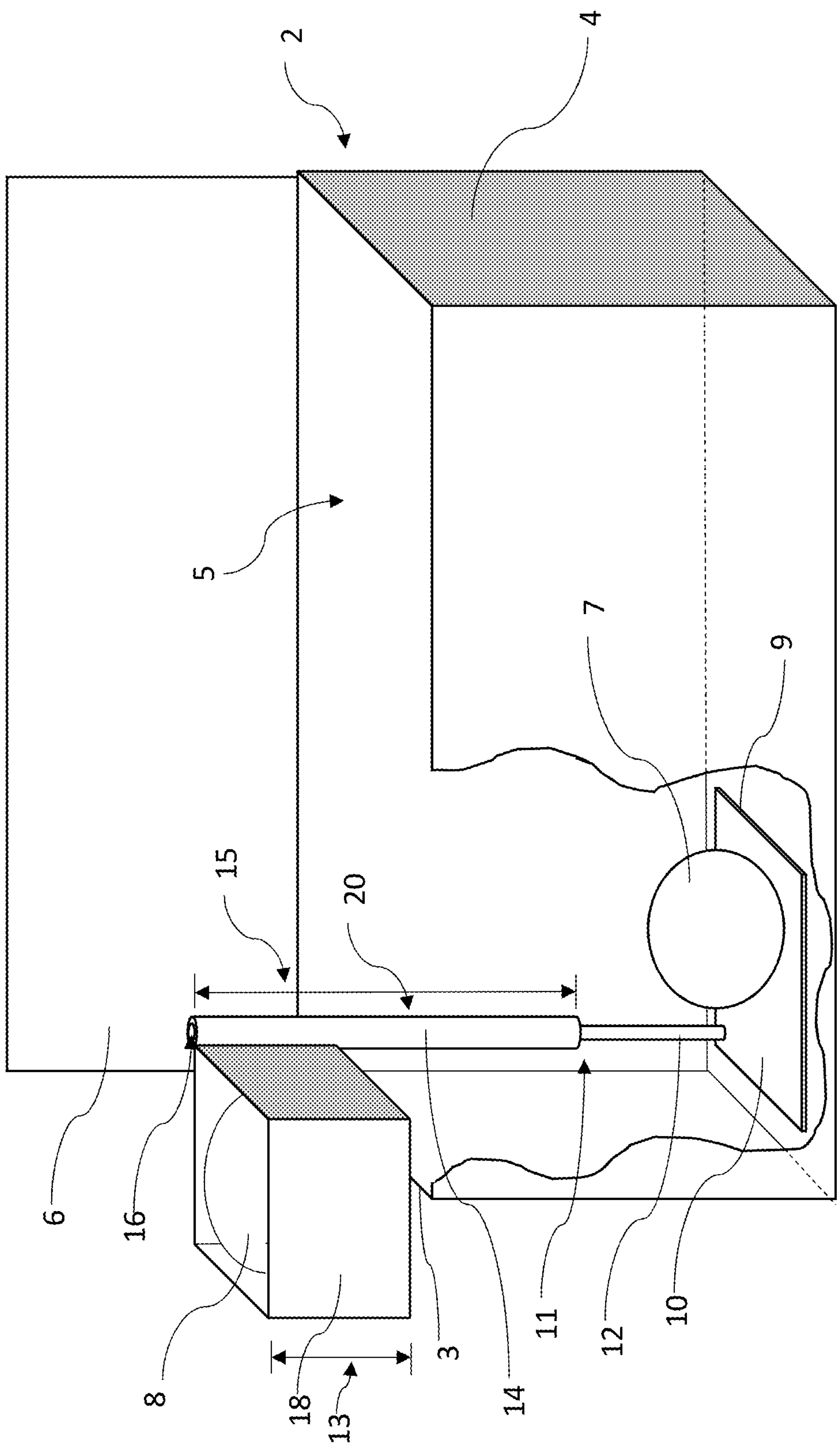
FIG. 5 is a view similar to FIG. 4 showing the storage member supported on a side of the chest freezer.

FIG. 4 shows storage member 18 at a lowest vertical position relative to base 10, and in this position, organizer 20 can fit entirely inside interior space 26 of chest freezer 2 when lid 6 is closed. Compared to the vertical height and horizontal orientation of storage member 18 relative to base 10 in FIG. 4, FIG. 5 shows storage member 18 both raised vertically and rotated horizontally relative to base 10. In FIG. 5, storage member 18 rests on top of upper ledge 3 of a side of body 4 of chest freezer 2 such that storage member 18 is maintained at a vertical height above base 10 and is maintained in a rotated position relative to base 10. In alternative embodiments or positions, storage member 18 can be maintained at a vertical height above base 10 and maintained in a rotated position relative to base 10 by resting on another organizer or other frozen items in chest freezer 2. Resting storage member 18 on upper ledge 3, another organizer, or other frozen items in chest freezer 4 such that storage member 18 is maintained at a vertical height above base 10 and is maintained in a rotated position relative to base 10 allows for increased access to frozen items stored in organizer 20, such as frozen item 8 positioned in storage member 18 and frozen item 7 positioned above base 10 but under where storage member 18 is positioned in FIG. 4.

Figure 6:
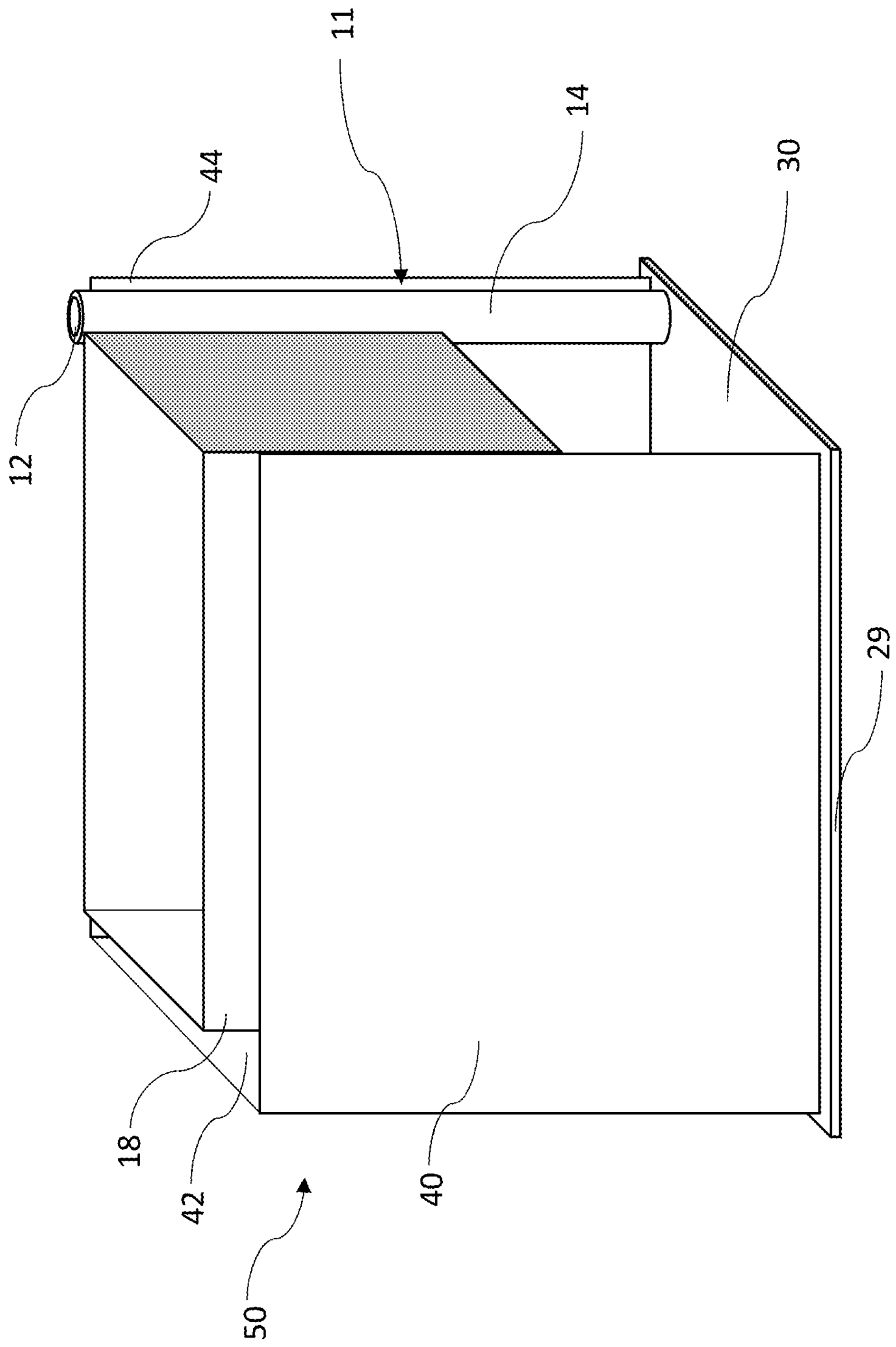
FIG. 6 is a perspective view of an exemplary organizer with one storage member, showing a hinge positioned between the storage member and a base of the organizer.
Figure 7:
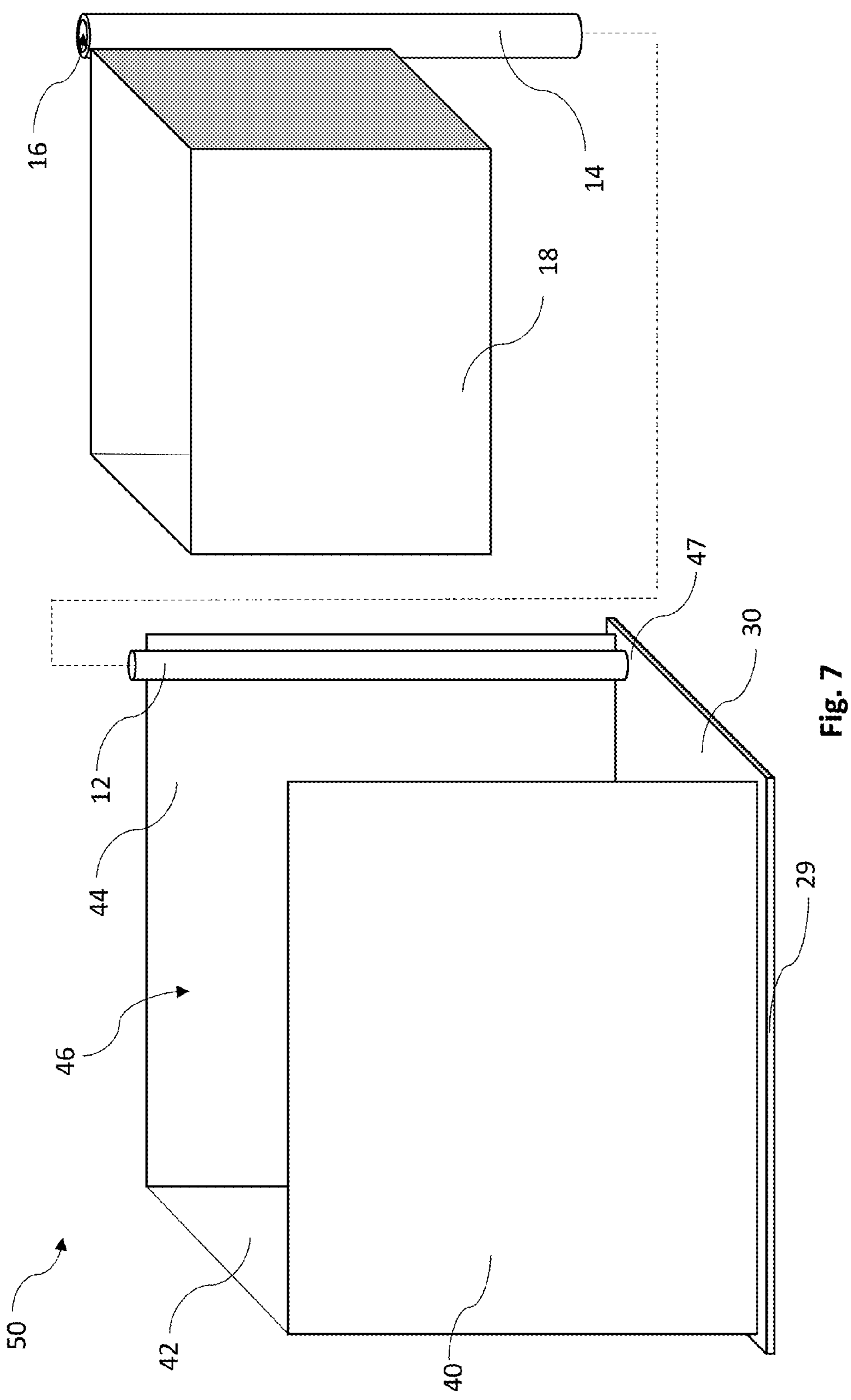
FIG. 7 is an exploded view of the exemplary organizer of FIG. 6 showing the hinge dissembled such that the storage member and the base are unconnected.

Referring to FIG. 6, an exemplary organizer 50 is provided. Organizer 50 includes base 30, storage member 18, vertical member 12, and coupling member 14. Base 30 and storage member 18 are both polygon-shaped. Organizer 50 is similar to organizer 20 except that base 30 includes a floor 29 and walls 40, 42, 44 to define an interior space 46 to store frozen items, whereas base 10 of organizer 20 includes floor 9 and no walls. As illustrated in FIG. 7, vertical member 12 preferably extends vertically from a corner 47 of base 30.

Together, vertical member 12 and coupling member 14 form hinge 11 between base 30 and storage member 18 to rotatably support storage member 18 such that storage member 18 can slide up relative to base 30 and rotate relative to base 30.

This allows increased access to frozen items, such as frozen food, that are positioned in storage member 18 or positioned in interior space 46 defined by floor 29 and walls 40, 42, 44 of base 30. Coupling member 14 couples storage member 18 to vertical member 12 such that storage member 18 can slide vertically relative to base 30 and rotate horizontally relative to base 30. Compared to the vertical height and horizontal orientation of storage member 18 relative to base 30 in FIG. 6, FIG. 8 shows storage member 18 both raised vertically and rotated horizontally relative to base 30.

Figure 8:
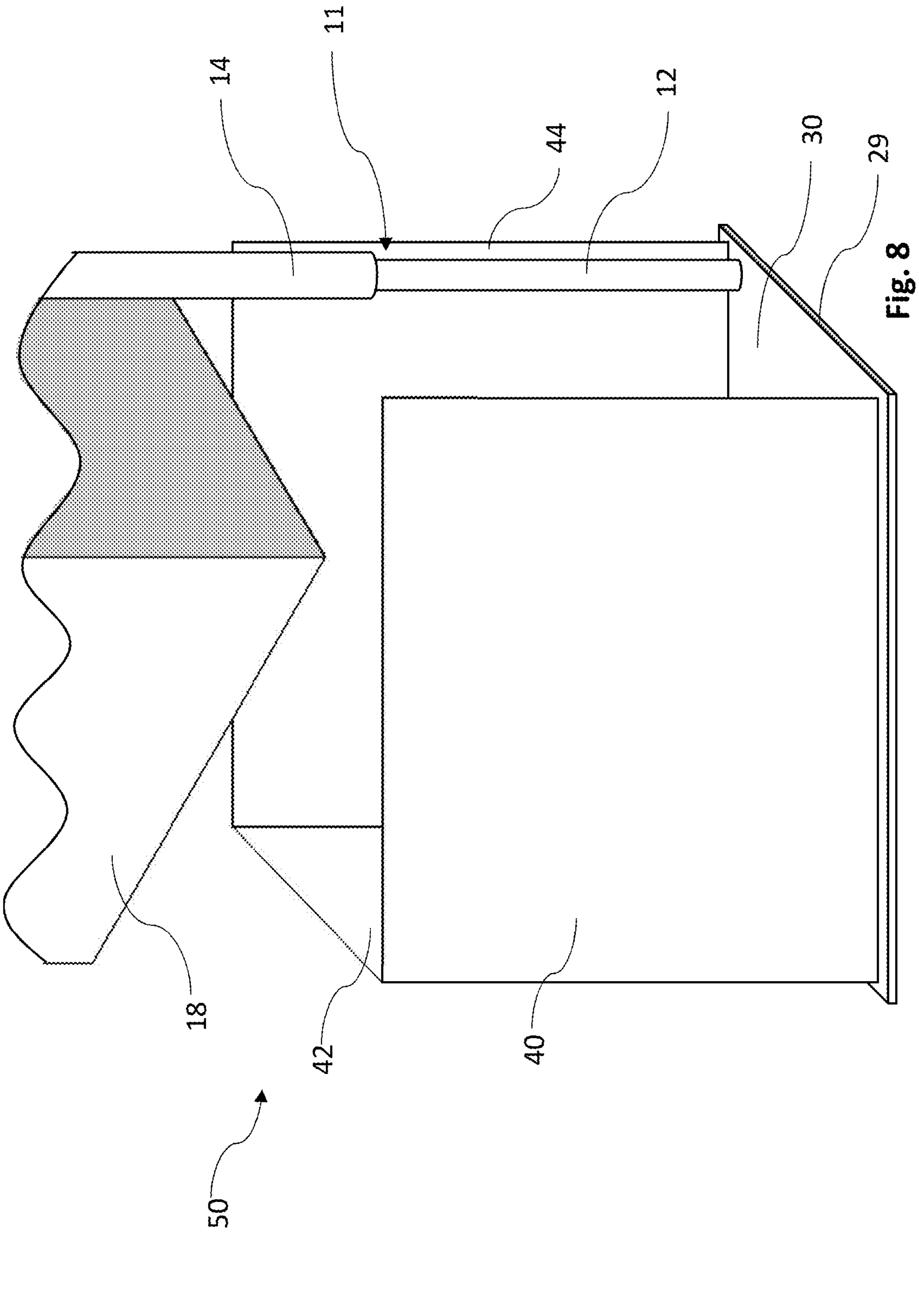
FIG. 8 is a perspective view of the exemplary organizer of FIG. 6 showing the storage member raised vertically and rotated horizontally relative to the base.

In FIG. 8, storage member 18 rests on top of side 44 of base 30 such that storage member 18 is maintained at a vertical height above base 30 and is maintained in a rotated position relative to base 30. In other embodiments, storage member 18 could rest on top of side 40, side 42, side 44, or any combination thereof. This allows for increased access to frozen items, such as frozen food, that are positioned in storage member 18 or positioned in interior space 46 defined by floor 29 and walls 40, 42, 44 of base 30.

Figure 9:
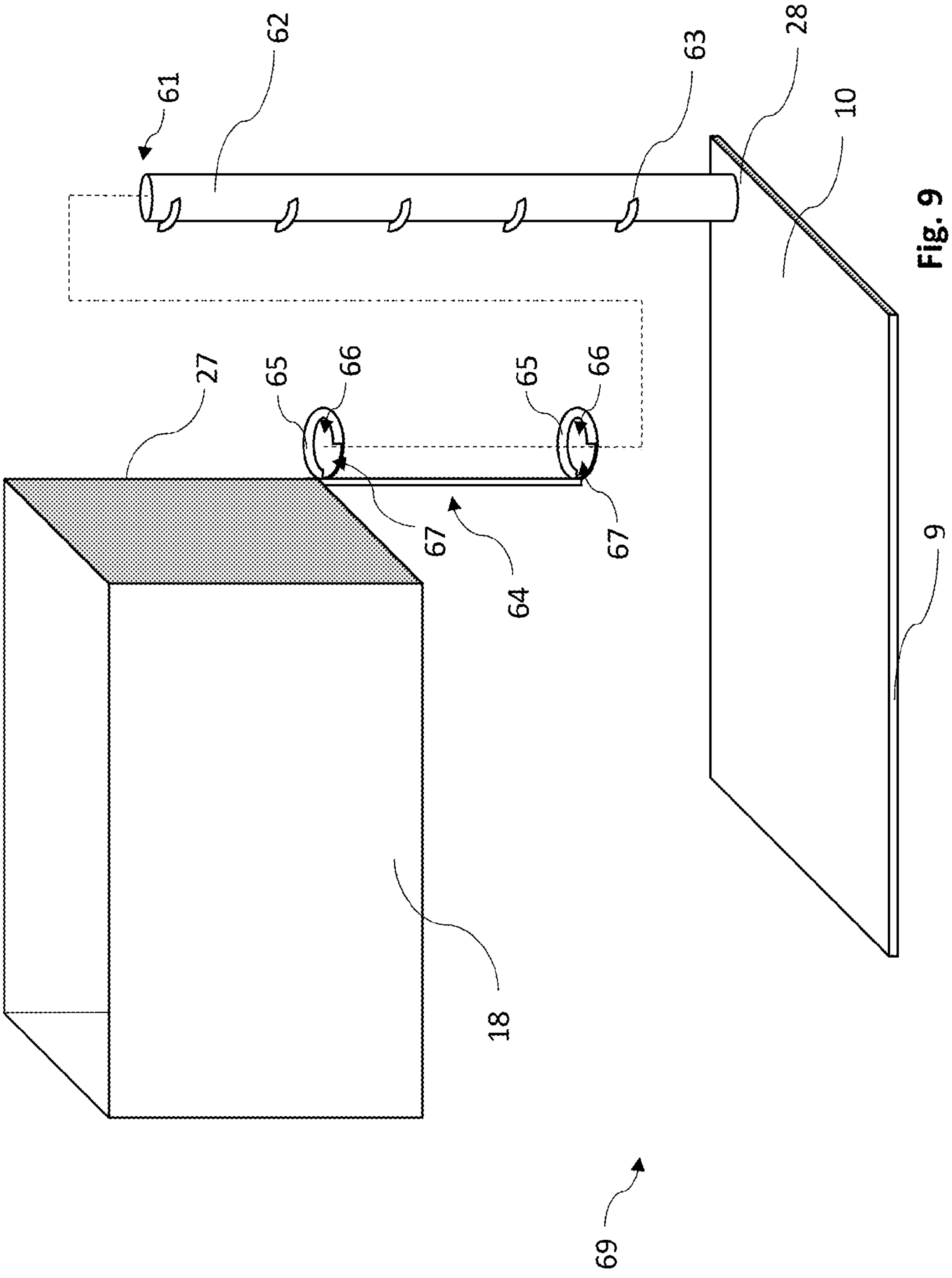
FIG. 9 is an exploded view of an exemplary organizer with one storage member, showing a hinge positioned between the storage member and a base of the organizer dissembled such that the storage member and the base are unconnected.

Referring to FIG. 9, an exemplary organizer 69 is provided. Organizer 69 includes base 10, storage member 18, vertical member 62, and coupling member 64. Coupling member 64 is supported on storage member 18 and includes rings 65 that define apertures 66. As illustrated by the exploded view of organizer 20 in FIG. 9, vertical member 62 extends vertically from base 10, preferably from a corner of base 10, and is received in apertures 66. Coupling member 64 is preferably supported on corner 27 of storage member 18.

Apertures 66 include slots 67, and vertical member 62 includes key-stocks 63. Slots 67 are sized and shaped to receive key-stocks 63 when slots 67 are aligned with key-stocks 63. Slots 67 are aligned with key-stocks 63 when apertures 66 are aligned with vertical member 62 and storage member 18 is positioned directly above base 10. Apertures 66 are sized and shaped to receive vertical member 62 such that rings 65 can slide freely vertically along vertical member 62 when slots 67 are aligned with key-stocks 63. When slots 67 are not aligned with key-stocks 63, rings 65 cannot slide freely vertically along the entire length of vertical member 62.

Key-stocks 63 can be support members configured to maintain storage member 18 at a vertical height relative to base 10. Key-stocks 63 allow storage member 18 to be locked in place at a certain height above base 10 when storage member 18 is raised vertically relative to base 10 (for example, by aligning slots 67 with key-stocks 63 such that rings 65 can slide freely vertically along vertical member 62) and then rotated horizontally relative to base 10 such that slots 67 are not aligned with key-stocks 63 and thus at least one ring 65 can rest on top of at least one key-stock 63.

Together, vertical member 62, coupling member 64, and apertures 66 form hinge 61 between base 10 and storage member 18 to rotatably support storage member 18 such that storage member 18 can slide up relative to base 10, rotate relative to base 10, and be maintained at a certain height above base 10. This allows increased access to frozen items, such as frozen food, that are positioned in storage member 18 or positioned above base 10 but below storage member 18 when storage member 18 is in a lowest position relative to base 10. Coupling member 64 couples storage member 18 to vertical member 62 such that storage member 18 can slide vertically relative to base 10 and rotate horizontally relative to base 10.

When storage member 18 is at a lowest vertical position relative to base 10, a space is provided between storage member 18 and base 10 by coupling member 64. This space is provided because coupling member 64 extends below the bottom or floor 21 of storage member 18 and is abutted from below, specifically by base 10, at a certain position such that coupling member 64 and thus storage member 18, on which coupling member 64 is supported, cannot slide further vertically downward, and at that certain position, a space exists between the bottom or floor 21 of storage member 18 and base 10.

Figure 10:
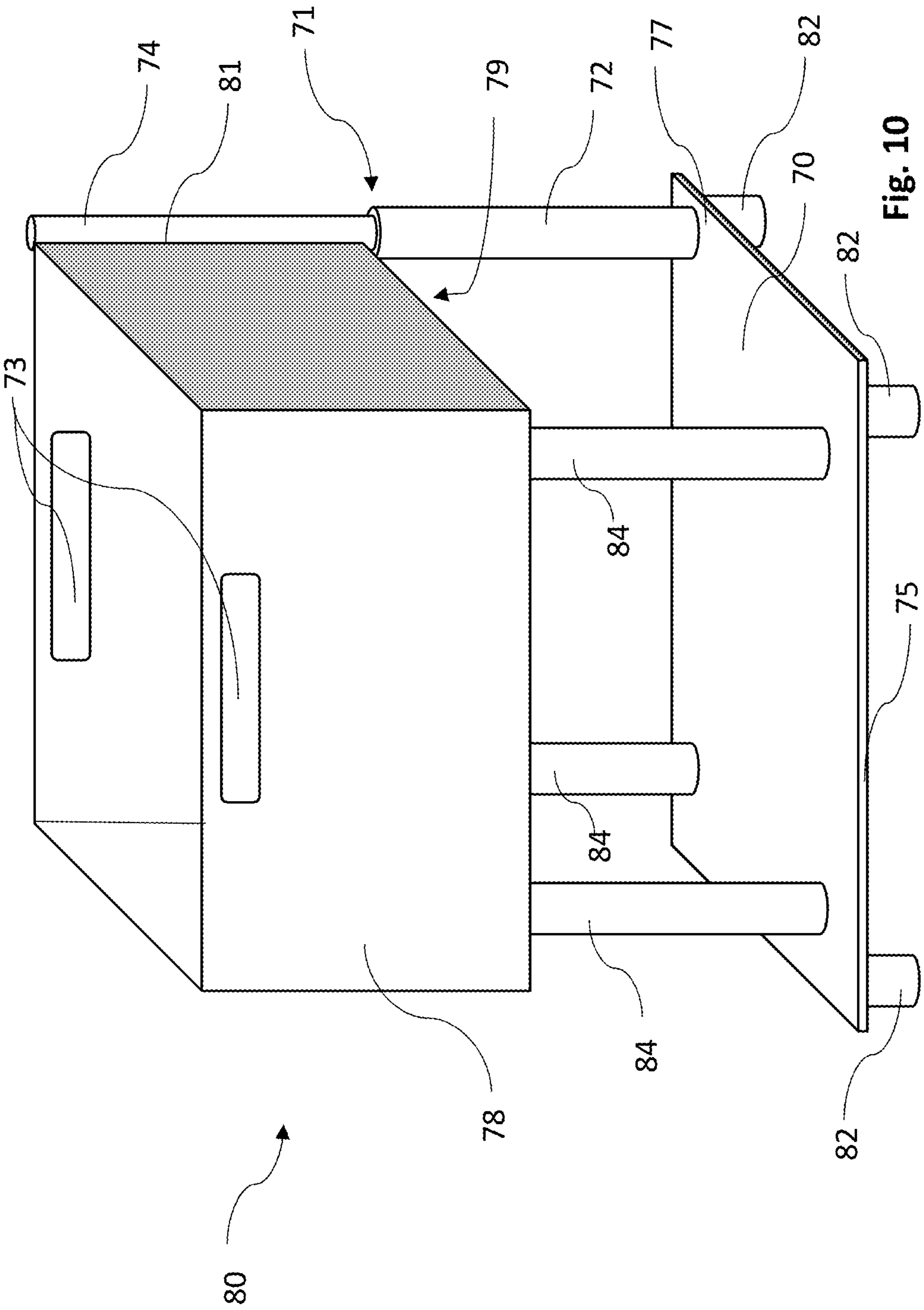
FIG. 10 is a perspective view of an exemplary organizer with one storage member, showing a hinge positioned between the storage member and a base of the organizer.
Figure 11:
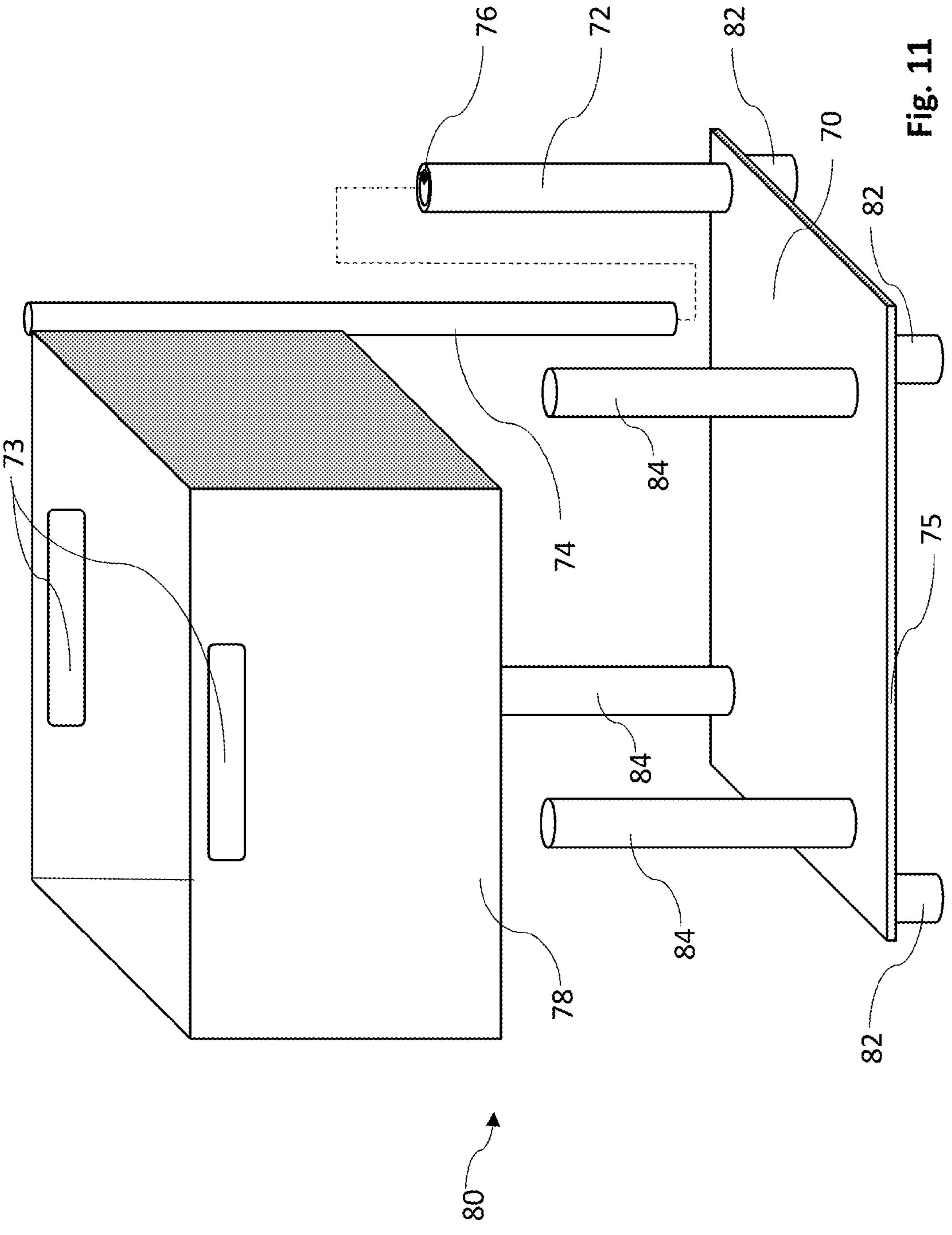
FIG. 11 is an exploded view of the exemplary organizer of FIG. 10 showing the hinge dissembled such that the storage member and the base are unconnected.

Referring to FIG. 10, another exemplary organizer 80 is provided. Organizer 80 includes base 70, storage member 78, vertical member 72, and coupling member 74. As illustrated by the exploded view of organizer 80 in FIG. 11, vertical member 72 extends vertically from a corner 77 of base 70 and includes aperture 76, which is formed in vertical member 72. Coupling member 74 is supported on a corner 81 of storage member 78 and is received in aperture 76.

Aperture 76 is sized to receive coupling member 74. In this embodiment, vertical member 72 is a hollow pole or tube and aperture 76 is a circular bore extending through vertical member 72. In other embodiments, vertical member 72 can be, for example, a clamp, pulley, ring, partial ring, key-stock, non-rigid member (e.g., elastic member, string, or wire), etc. and aperture 76 can be, for example, a hole, opening, gap, slot, etc. Aperture 76 can extend completely through or only partially through vertical member 72. In this embodiment, coupling member 74 is a circular support pole. In other embodiments, coupling member 74 can be, for example, a pole of different shape, a wall, or a non-rigid member (e.g., string or wire). Holes 73 are formed in storage member 78. In other embodiments, more holes, less holes, or no holes can be formed in a storage member. Holes 73 can be used as handles for lifting or rotating storage member 78 relative to base 70. In other embodiments, other types of handles can be included in an organizer for lifting or rotating a storage member relative to a base.

Figure 12:
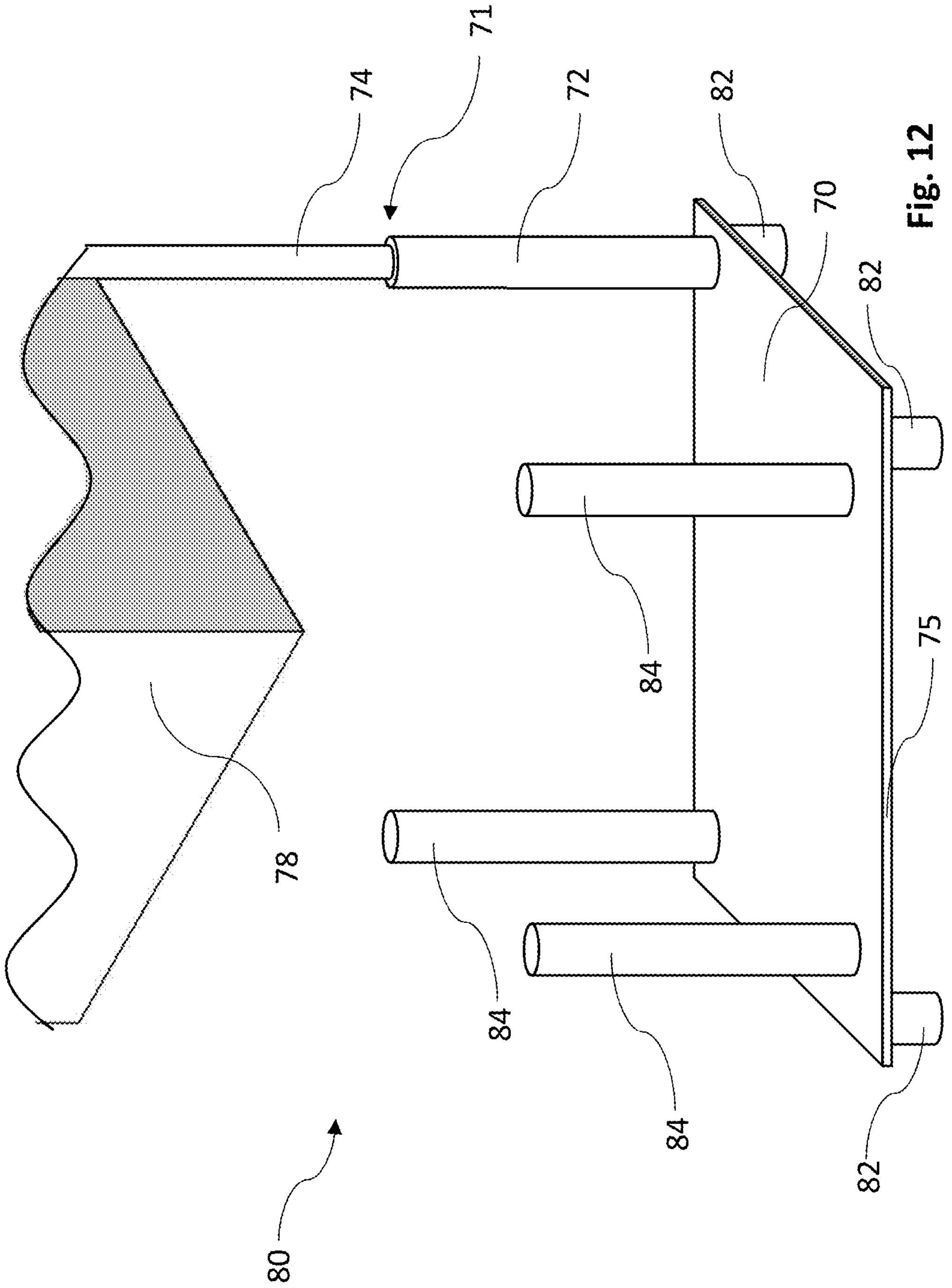
FIG. 12 is a perspective view of the exemplary organizer of FIG. 10 showing the storage member raised vertically and rotated horizontally relative to the base.

Together, vertical member 72 and coupling member 74 form hinge 71 between base 70 and storage member 78 to rotatably support storage member 78 such that storage member 78 can slide up relative to base 70 and rotate relative to base 70. This allows increased access to frozen items, such as frozen food, that are positioned in storage member 78 or positioned above base 70 but under where storage member 78 is positioned in FIG. 10. Coupling member 74 couples storage member 78 to vertical member 72 such that storage member 78 can slide vertically relative to base 70 and rotate horizontally relative to base 70. Compared to the vertical height and horizontal orientation of storage member 78 relative to base 70 in FIG. 10, FIG. 12 shows storage member 78 both raised vertically and rotated horizontally relative to base 70.

When storage member 78 is at a lowest vertical position relative to base 70, a space is provided between storage member 78 and base 70 by spacers 84. More specifically, spacers 84 provide a space between floor 75 of base 70 and floor 79 (not shown) of storage member 78. This space is also provided by coupling member 74 because coupling member 74 extends below the bottom or floor 79 of storage member 78 and is abutted from below, specifically by base 70, at a certain position such that coupling member 74 and thus storage member 78, on which coupling member 74 is supported, cannot slide further vertically downward, and at that certain position, a space exists between the bottom or floor 79 of storage member 78 and base 70. Spacers 84 can also serve as a support members to maintain storage member 78 at a certain vertical height above base 70. For example, the height of spacers 84 can be adjustable (e.g., via telescoping) so as to allow the lowest vertical position of storage member 78 relative to base 70 to be adjustable.

Organizer 80 includes legs 82 coupled to and extending downward from base 70. Legs 82 can be adjustable so as to allow the overall height of organizer 80, and specifically the height of base 70 above the floor of a chest freezer, to be adjusted. For example, legs 82 can be telescoping.

Figure 13:
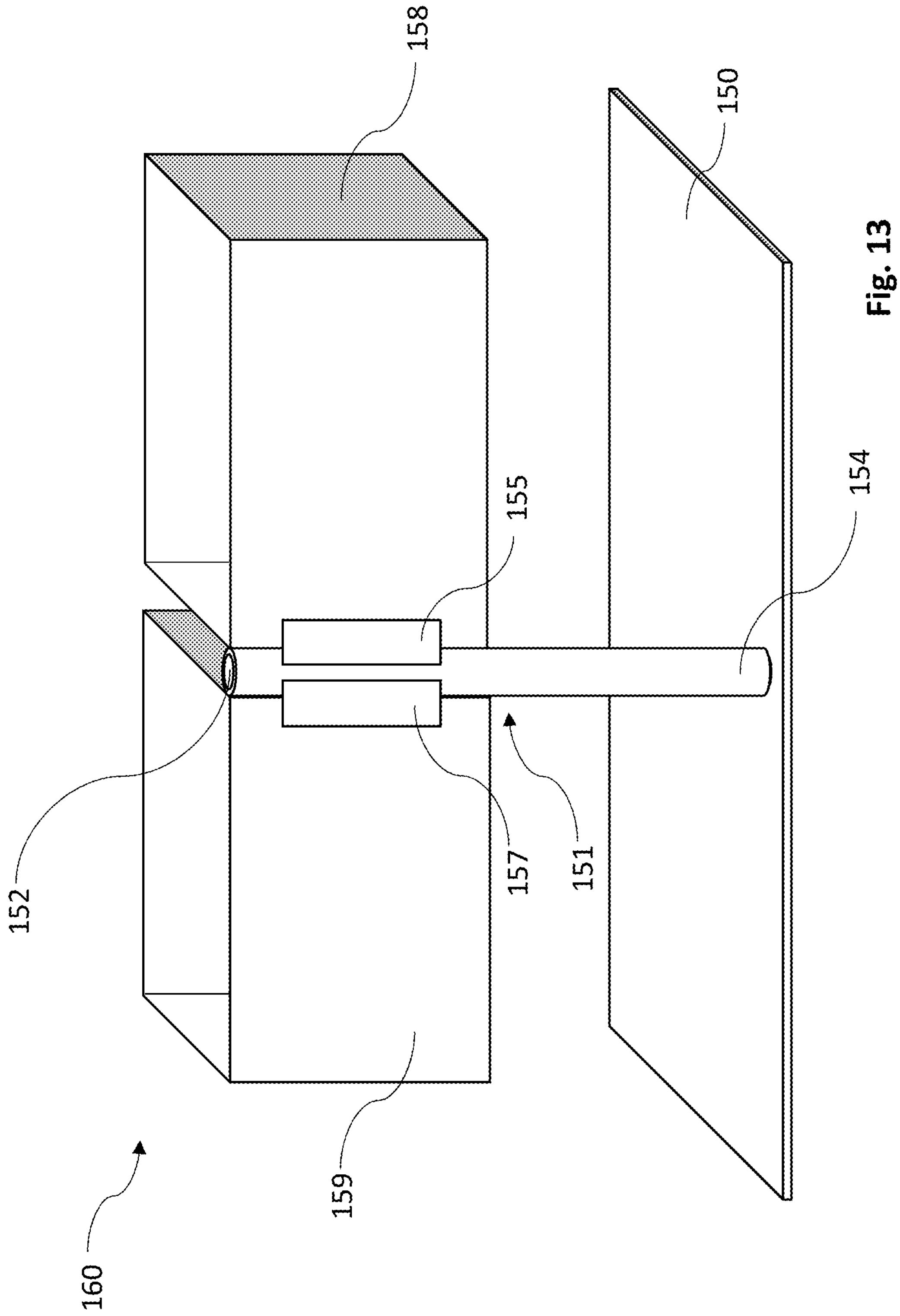
FIG. 13 is a perspective view of an exemplary organizer with two storage members, showing a hinge positioned between the storage members and a base of the organizer.

Referring to FIG. 13, another exemplary organizer 160 is provided. Organizer 160 includes base 150, storage members 158, 159, vertical member 152, and coupling member 154. Base 150 and storage members 158, 159 are both polygon-shaped.

Coupling member 154 includes a hollow pole or tube portion and secondary hinges 155, 157 supported on the hollow pole or tube portion. Coupling member 154 is supported on a corner of storage member 158 by secondary hinge 155 and is supported on a corner of storage member 159 by secondary hinge 157. Secondary hinges 155, 157 allow storage members 158, 159 to rotate horizontally relative to base 150. Secondary hinges 155, 157 can comprise, for example, flexible material or moving components.

Figure 14:
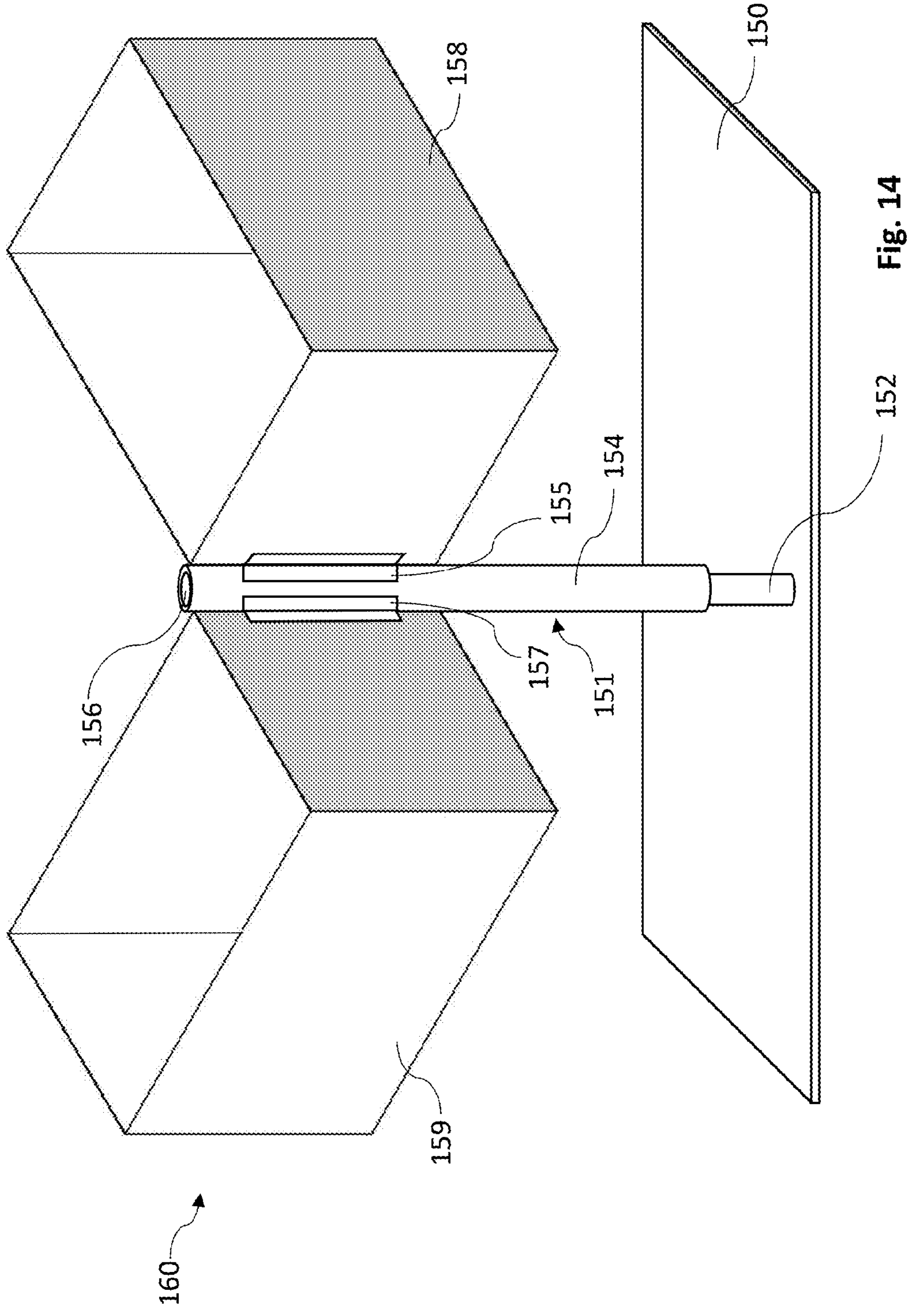
FIG. 14 is a perspective view of the exemplary organizer of FIG. 13 showing the storage members raised vertically and rotated horizontally relative to the base.

As illustrated by FIG. 14, vertical member 152 extends vertically from base 150 and is received in aperture 156 formed in the hollow pole or tube portion of coupling member 154. Aperture 156 is sized to receive vertical member 152. In this embodiment, aperture 156 is a circular bore extending through the hollow pole or tube portion of coupling member 154 and vertical member 152 is a circular support pole.

Together, vertical member 152, coupling member 154, and aperture 156 form hinge 151 between base 150 and storage members 158, 159 to rotatably support storage members 158, 159 such that storage members 158, 159 can each slide up relative to base 150 and rotate relative to base 150. This allows increased access to frozen items, such as frozen food, that are positioned in storage members 158, 159 or positioned above base 150 but under where storage members 158, 159 are positioned in FIG. 13. Coupling member 154 couples storage members 158, 159 to vertical member 152 such that storage members 158, 159 can slide vertically relative to base 150 and rotate horizontally relative to base 150. Compared to the vertical height and horizontal orientation of storage members 158, 159 relative to base 10 in FIG. 13, FIG. 14 shows storage members 158, 159 both raised vertically and rotated horizontally relative to base 150.

FIGS. 15, 16, 17, 18 represent another embodiment of the present disclosure. In this embodiment, organizer 130 can include multiple sets and combinations of storage members 122, 124, 126, 128 for usage in larger chest freezers. In conjunction with the increased capacity for storage members 122, 124, 126, 128 in this embodiment, there is a corresponding increase in the number of vertical members 102, 104, 106, 108 upon which storage members 122, 124, 126, 128 will be positioned. Vertical members 102, 104, 106, 108 extend upward from base 100 and are coupled to storage members 122, 124, 126, 128 so as to allow storage members 122, 124, 126, 128 to be raised vertically along vertical members 102, 104, 106, 108 in relation to base 100. This is demonstrated in FIG. 18, which shows third storage member 126 raised vertically on vertical member 106 relative to base 100 as compared to the vertical height of third storage member 126 relative to base 100 in FIG. 15 and FIG. 16. Additionally, the connection between storage members 122, 124, 126, 128 and vertical members 102, 104, 106, 108 will allow for storage members 122, 124, 126, 128 to be rotated horizontally in relation to base 100. This is demonstrated in FIG. 18, which shows second storage member 124 and third storage member 126 both rotated horizontally relative to base 100 as compared to the horizontal orientations of second storage member 124 and third storage member 126 relative to base 100 in FIG. 15, FIG. 16, and FIG. 17.

Figure 17:
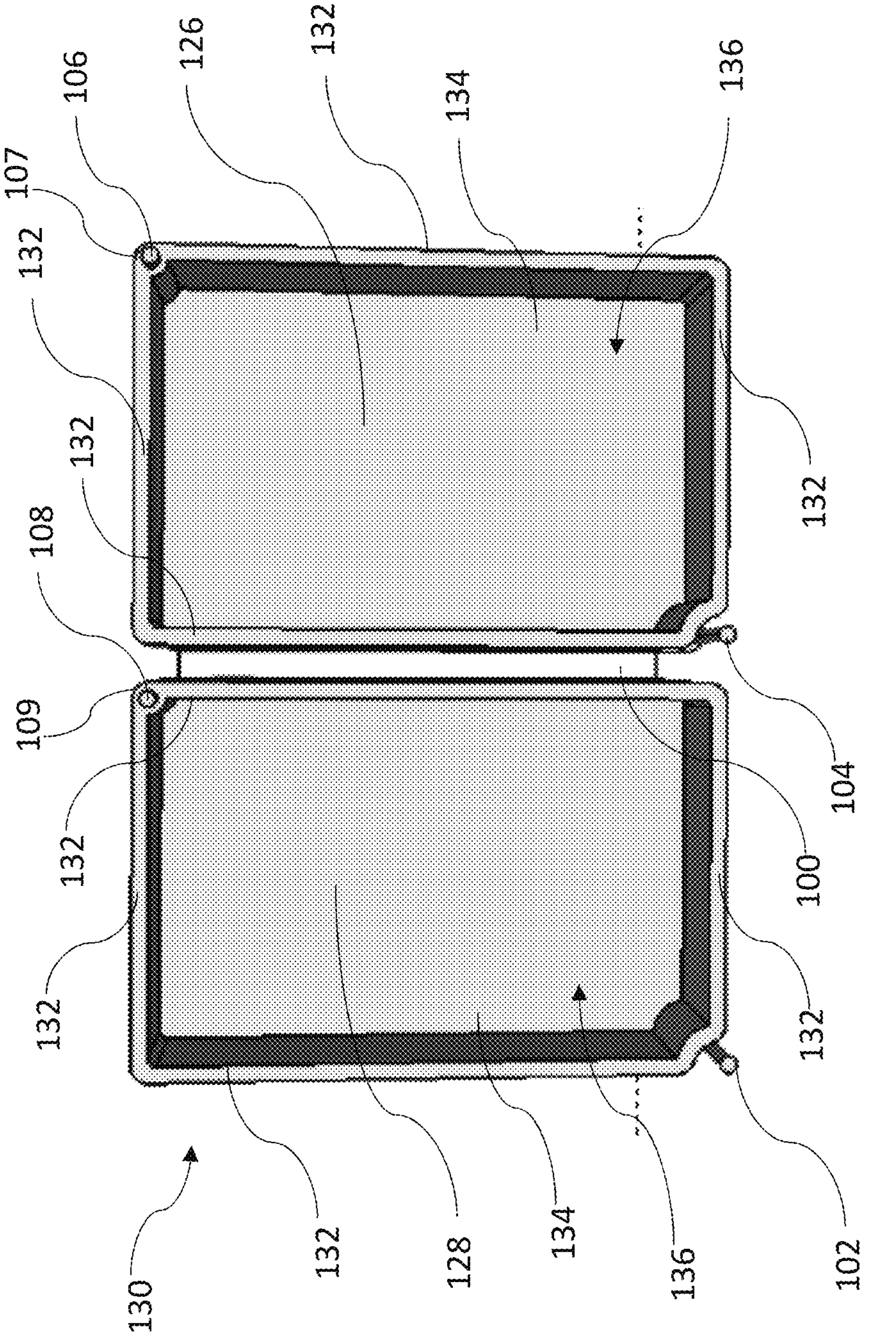
FIG. 17 is a top view of the exemplary organizer of FIG. 15.

As shown in FIG. 17, storage members 128, 126 of organizer 130 each contain four walls 132 and a floor 134 that define an interior space 136 configured to store frozen items. As shown in FIG. 17, vertical members 106, 108 are positioned so as to attach to corner 107, 109 of storage members 126, 128. Storage members 126, 128 are shaped so as to allow for vertical members 102, 104, which are coupled to lower positioned storage members 122, 124, without impairing either the vertical movement or horizontal rotation of upper positioned storage members 126, 128 relative to base 100.

Figure 15:
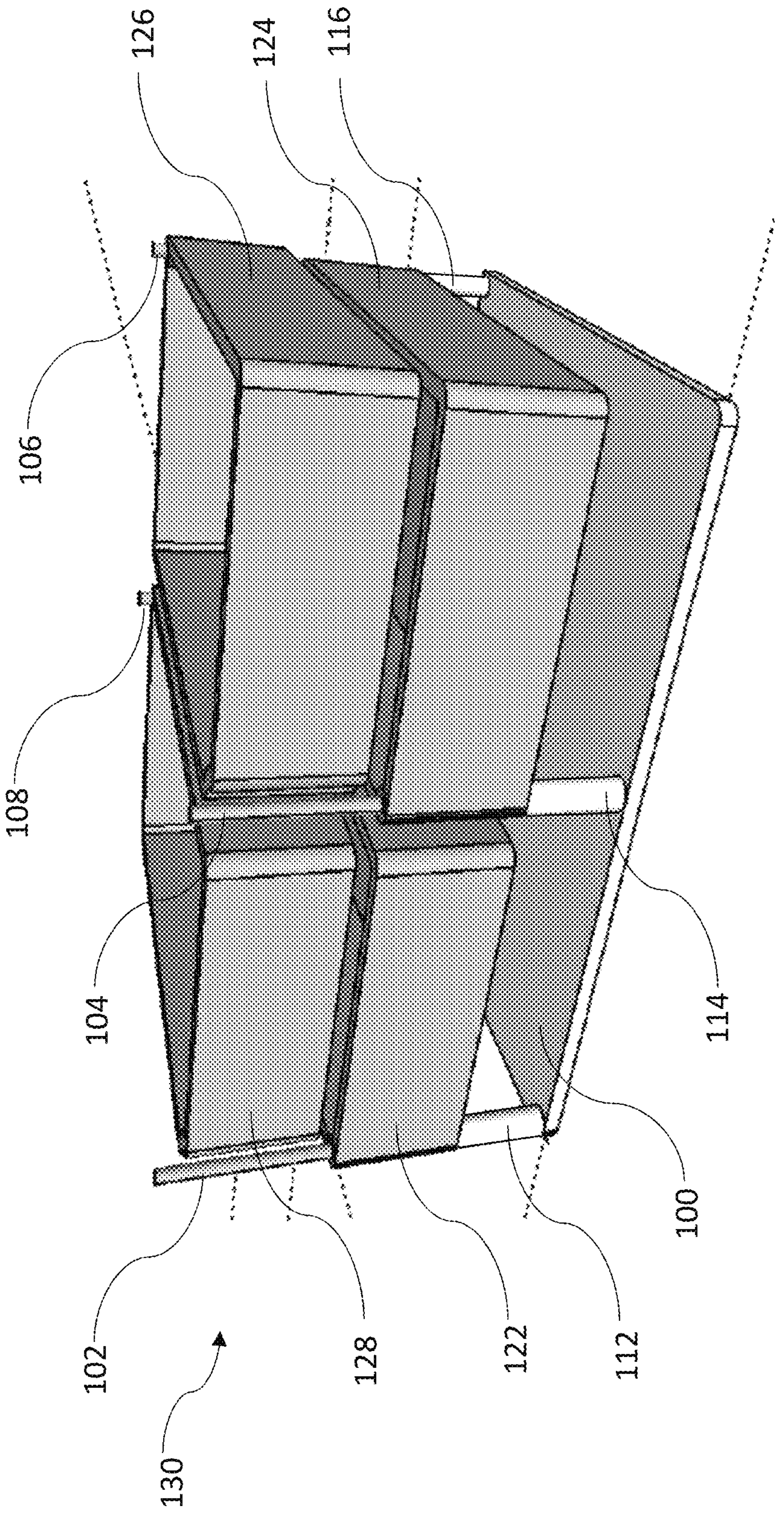
FIG. 15 is a perspective view of an exemplary organizer with four storage members, showing hinges positioned between the storage members and a base of the organizer.
Figure 16:
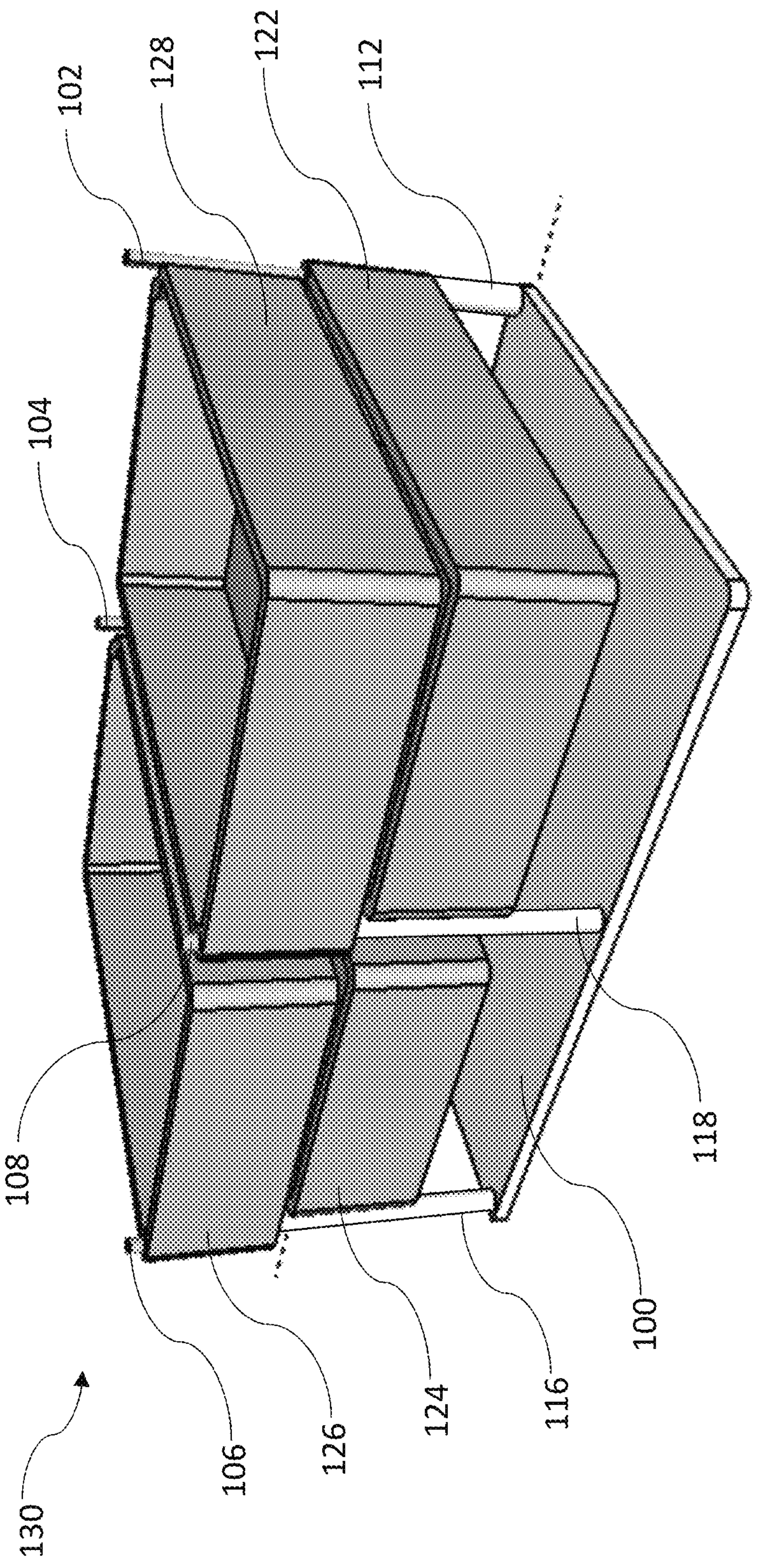
FIG. 16 is a another perspective view of the exemplary organizer of FIG. 15.
Figure 18:
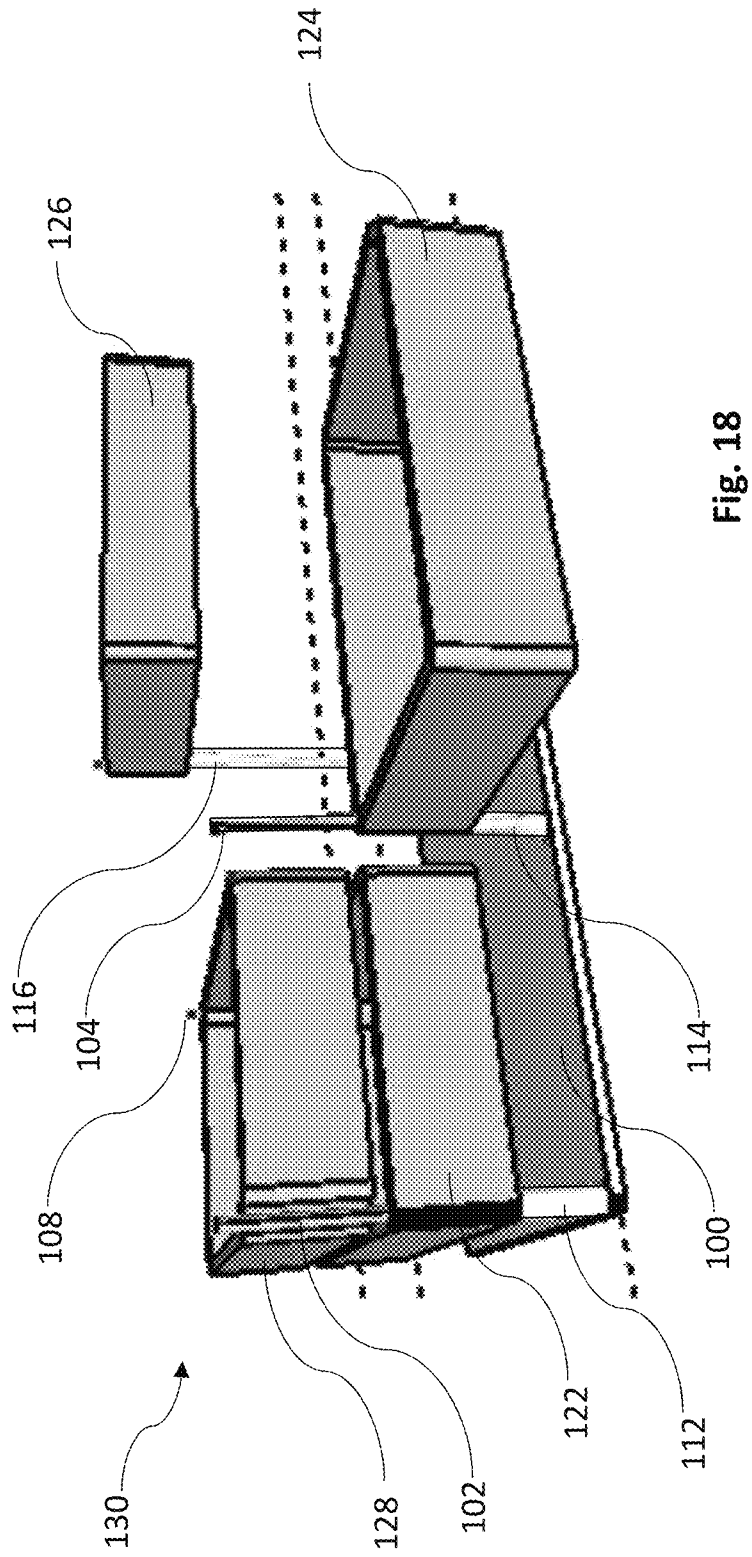
FIG. 18 is a perspective view of the exemplary organizer of FIG. 15 showing one storage member raised vertically and rotated horizontally relative to the base and another storage member rotated horizontally relative to the base.

Additionally, this embodiment may also include vertical spacers 112, 114, 116, 118 as seen in FIG. 15, FIG. 16, and FIG. 18. Referring to FIGS. 15, 16, and 18, vertical spacers 112, 114, 116, 118 can be used to set a lowest position of storage members 122, 124, 126, 128. Vertical spacers 112, 114, 116, 118 can thereby provide a space between storage members 122, 124, 126, 128 and base 100 when storage members 122, 124, 126, 128 are in a lowest position relative to base 100. For example, spacers 112, 114 can provide that the bottom-most portions of storage members 122, 124 configured closest to base 100 do not rest on base 100 itself when storage members 122, 124 are in a lowest position relative to base 100. Also, for example, spacers 116, 118 can define a fixed or adjustable height relative to base 100 for storage members 126, 128 below which storage members 126, 128 cannot be vertically lowered relative to base 100. Storage members 126, 128 are configured to be positioned above storage members 122, 124 when storage members 122, 124, 126, 128 are each in a lowest position relative to base 100.

As shown in FIGS. 15 and 16, spacers 112, 114, 116, 118 can be coupled to vertical members 102, 104, 106, 108 but may also be completely independent of vertical members 102, 104, 106, 108 in other embodiments. Spacers 112, 114, 116, 118 can be supported on vertical members 102, 104, 106, 108, storage members 122, 124, 126, 128, base 100, or any combination thereof Also, spacers 112, 114, 116, 118 can serve as support members to maintain storage members 122, 124, 126, 128 at certain vertical heights above base 100. For example, heights of spacers 112, 114, 116, 118 relative to base 100 can be adjustable (e.g., via telescoping) so as to allow a lowest vertical position of storage members 122, 124, 126, 128 relative to base 100 to be adjustable.

In additional embodiments, an organizer can be provided with any number or combination of storage members, vertical members, coupling members, or hinges. A storage member can be, for example, a shelf, basket, or container and may include holes. A storage member can comprise, for example, a metal and/or a plastic.

Figure 19:
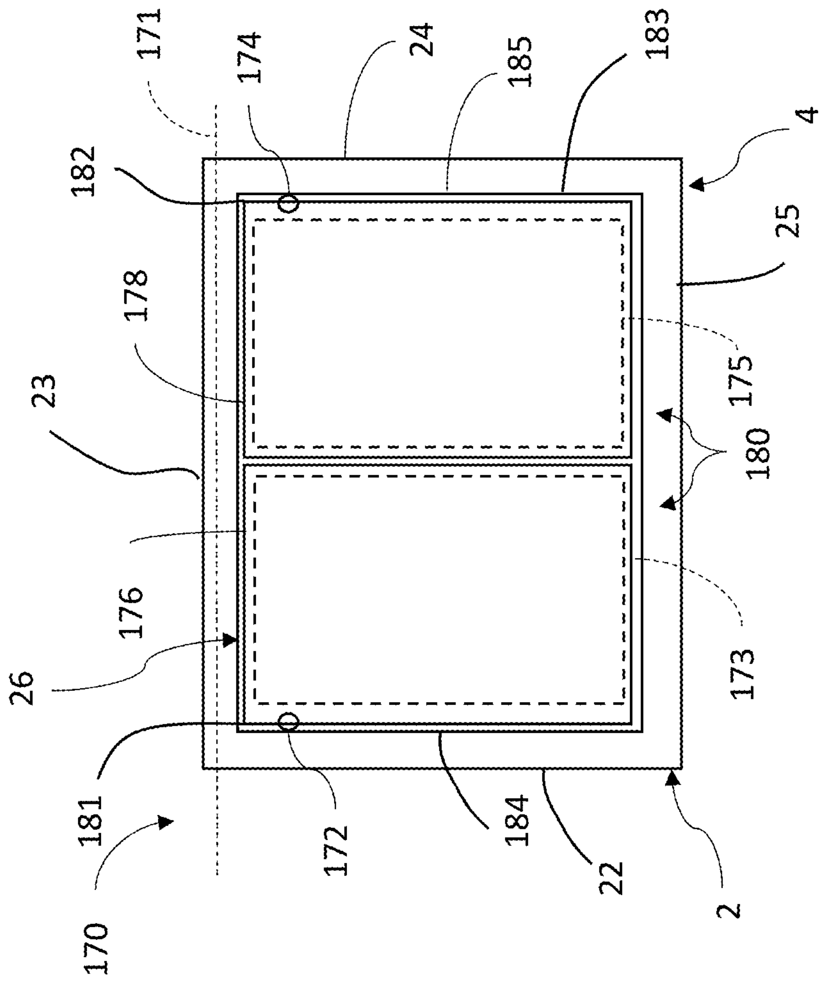
FIG. 19 is a top view of another embodiment of two organizers showing vertical members spaced apart from the respective corners of the storage members.

FIG. 19 shows a top view of another embodiment organizer 180 of the disclosure. As mentioned above, chest freezer 2 includes lid 6 (not shown in FIG. 19), which covers the entirety of interior space 26. Lid 6 has an axis of rotation 171 positioned adjacent a back of body 4 of chest freezer 2.

Organizers 180 include vertical members 172, 174 which are coupled to corner 181 of storage members 173, 176 and corner 182 of storage members 175, 178 respectively and are adjacent to inside 183 of walls 22, 23, 24, 25 of chest freezer 2. Vertical members 172, 174 are coupled to bases 100 (not shown in FIG. 19) of organizers 180. Vertical members 172, 174 are spaced apart from centers of 184, 185 of walls 22, 24 that vertical members 172, 174 are adjacent to. Storage members 176, 178 are above storage members 173, 175 (shown in phantom) respectively. In some embodiments, storage members 173, 175 are not coupled to vertical members 172, 174. Storage members 173, 175 can also be smaller than storage members 176, 178. In some embodiments the vertical members are coupled to chest freezer 2.

In other embodiments organizers 180 can include any number or combination of storage members and vertical members.

Figure 20:
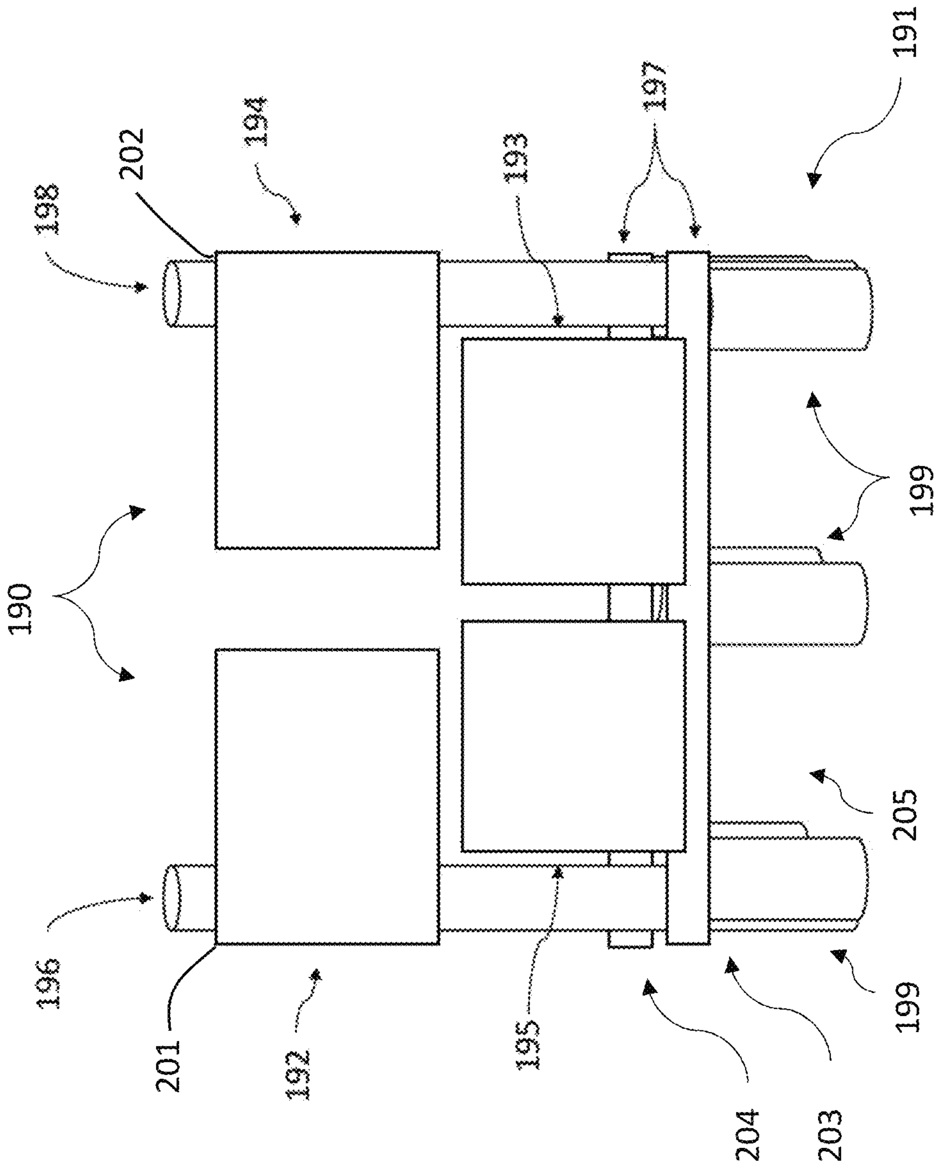
FIG. 20 is a side view of another embodiment of two organizers including two stands creating space below the lower storage members.

FIG. 20 shows a side view of another embodiment with organizers 190 sitting on organizer stand/base 191. Organizers 190 include vertical members 196, 198 and storage members 192, 193, 194, 195. Organizer stand 191 includes two separate pieces 203, 204. Each piece 203, 204 includes horizontal members 197 and vertical members 199 attached underneath horizontal members 197. Vertical members 199 provide storage space by creating area 205 between horizontal members 197 and chest freezer 2. Organizer stand 191 can include any number of horizontal members 197 or vertical members 199. Organizers 190 include vertical members 196, 198 coupled to corners 201, 202 of storage members 192, 194. Vertical members 196, 198 extend down to a bottom of vertical members 199. Horizontal members 197 are separated from each other to allow for a user to reach down between pieces 203, 204. Storage members 193, 195 sit below storage members 192, 194 and on top of horizontal members 197. In other embodiments organizers 190 can include any number or combination of storage members and vertical members.

Figure 21:
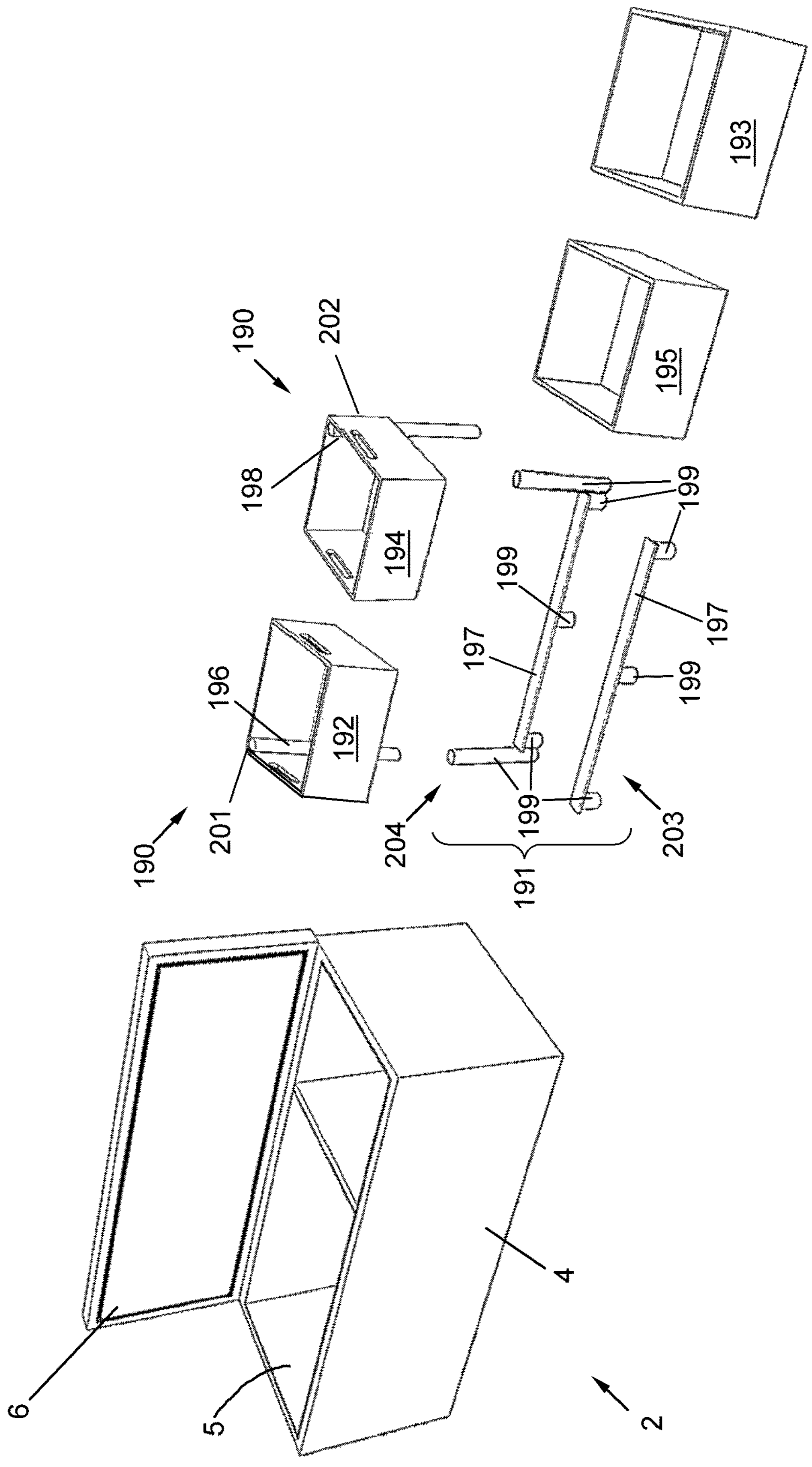
FIG. 21 represents an exploded view of the embodiment of FIG. 20 alongside a chest freezer.
Figure 22:
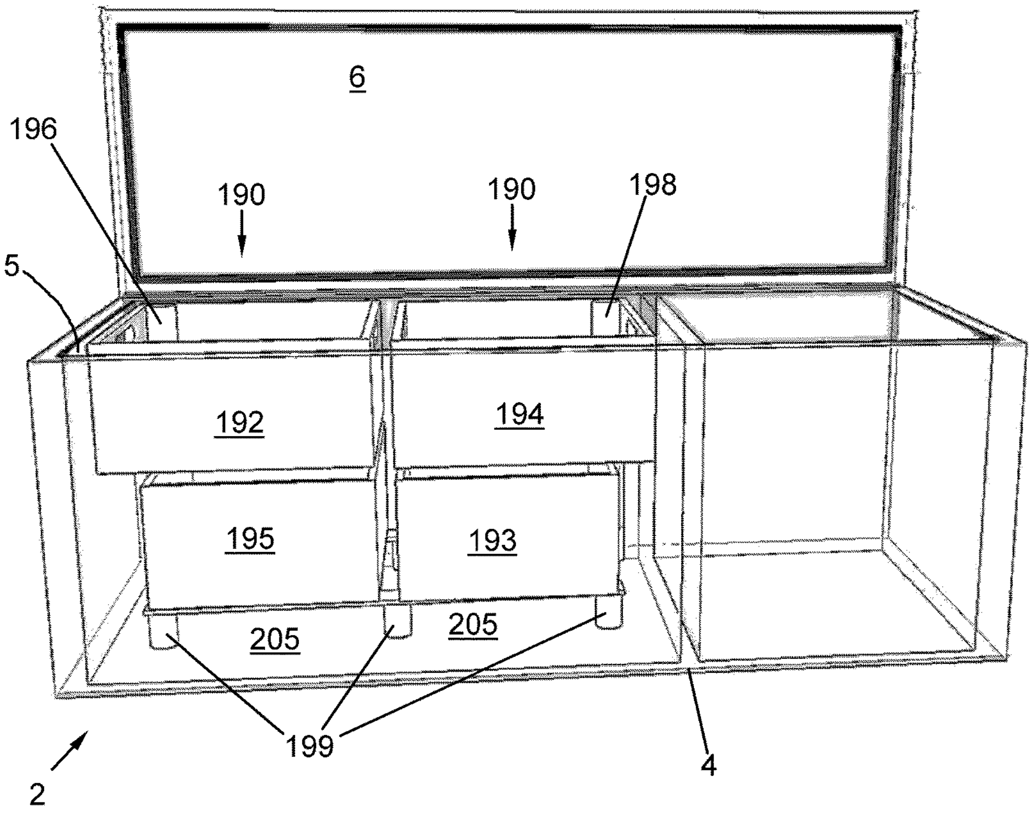
FIGS. 22 through 26 represent various views of the embodiment of FIGS. 20 and 21 placed in the chest freezer of FIG. 21.
Figure 23:
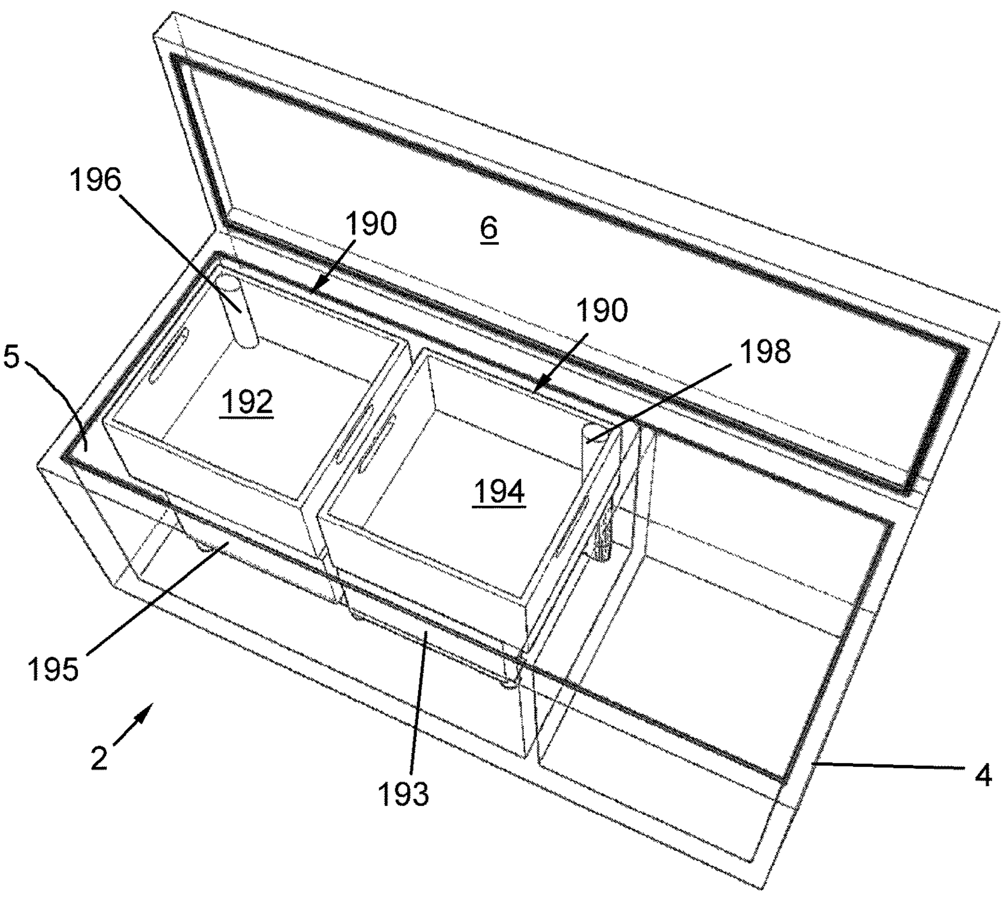
Figure 24:
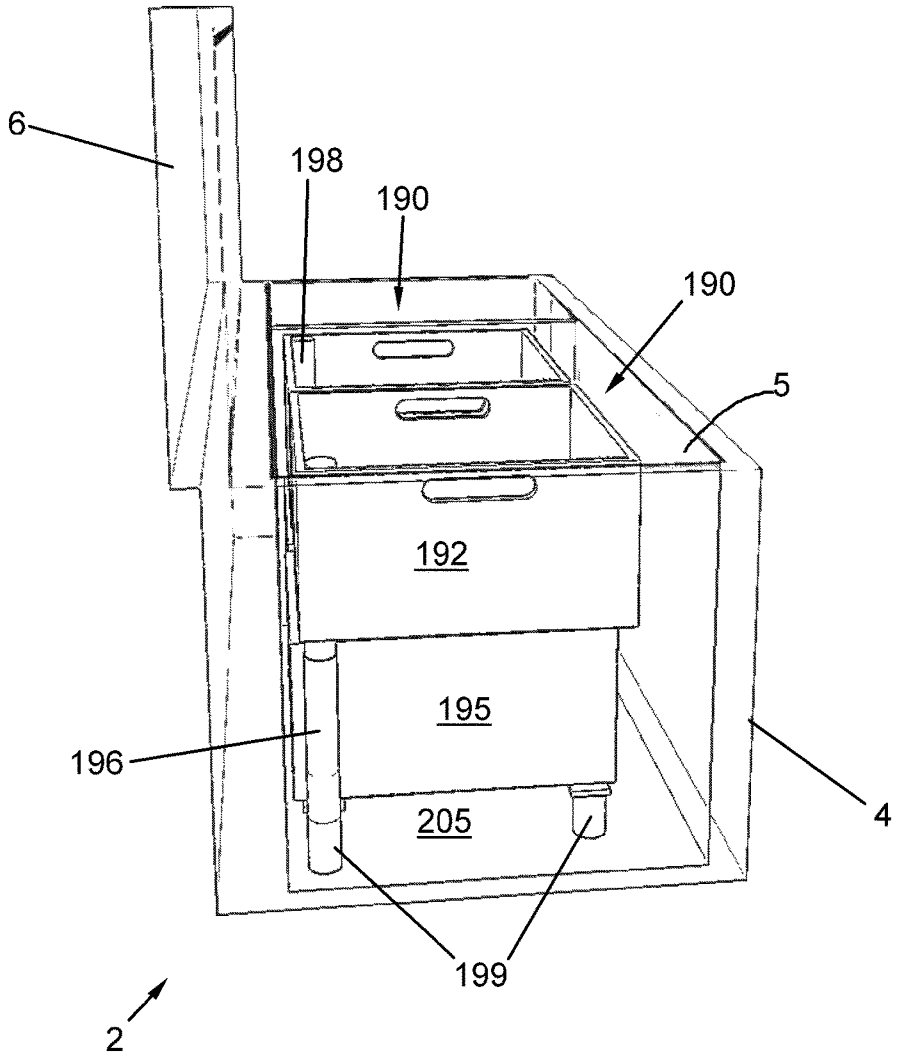
Figure 25:
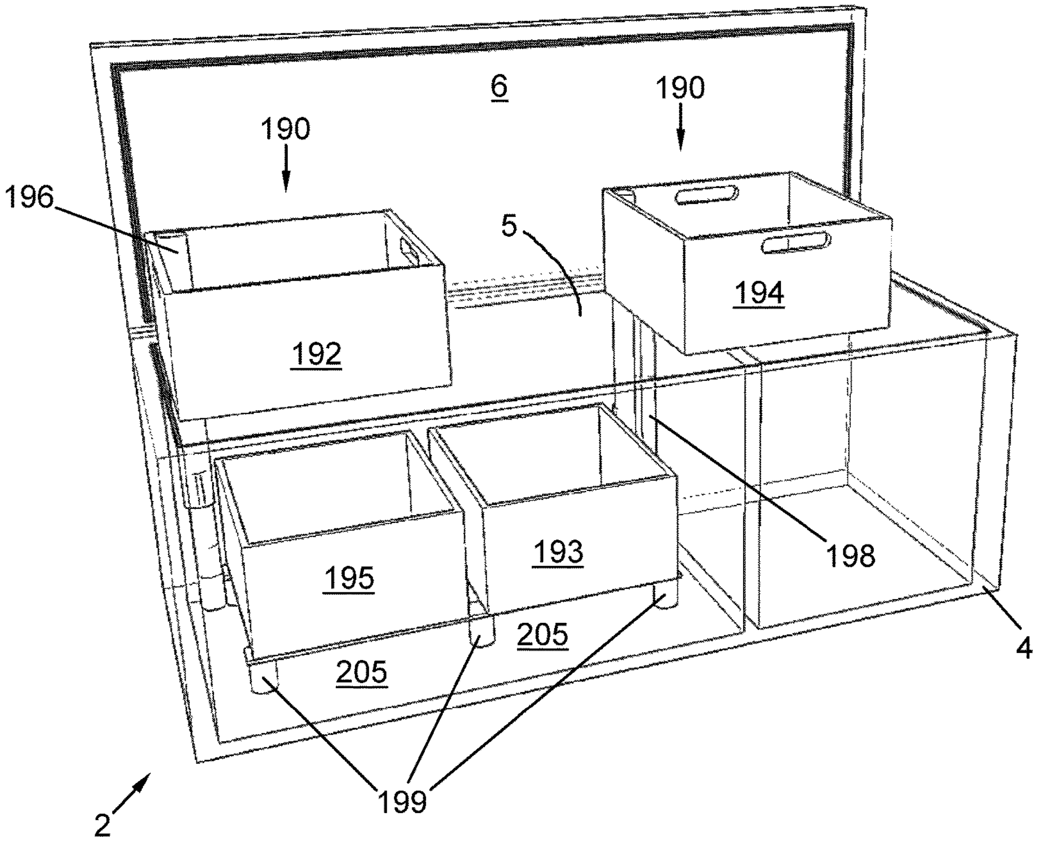
Figure 26:
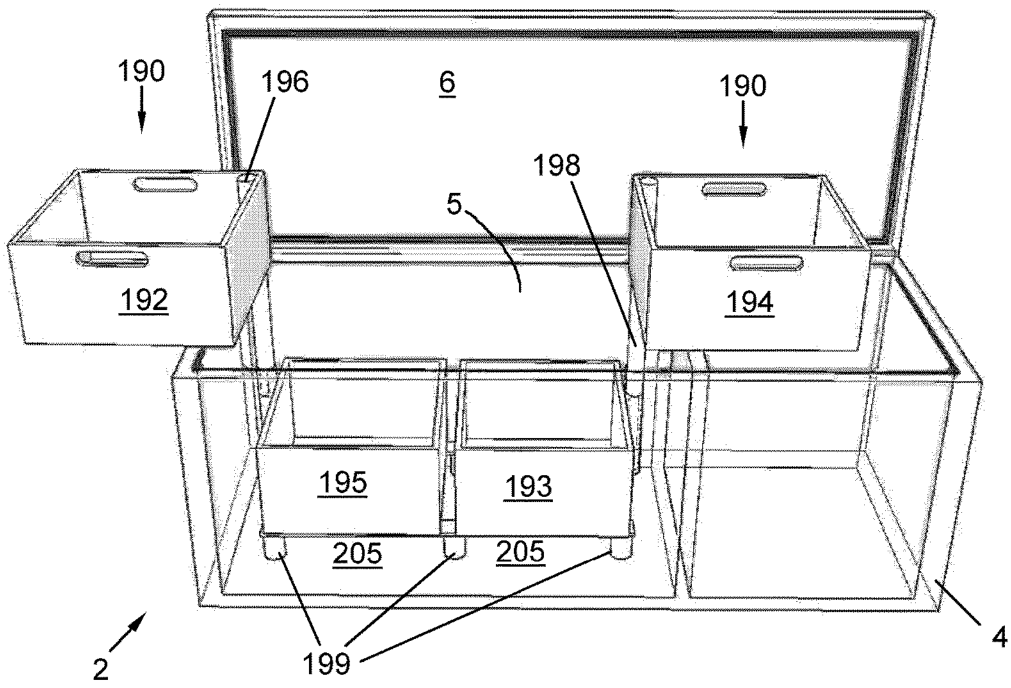

FIG. 21 represents an exploded view of the embodiment of FIG. 20 alongside a chest freezer 2 having body 4, interior space 5, and lid 6 corresponding to the freezer 2 described in reference to previous embodiments, and FIGS. 22 through 26 represent various views of the embodiment of FIGS. 20 and 21 placed in the chest freezer 2 of FIG. 21.

According to embodiments of the present disclosure, interior space 26 is divided into four quadrants: front-left, front-right, rear-left, and rear-right. Typically, vertical members, such as vertical member 12, are positioned in one of the quadrants, but not in the other three quadrants. Some vertical members, such as vertical member 12, are located in the outer apex of a corner of a storage member, while others, such as vertical members 172, 174, are not.

According to several embodiments disclosed herein, a lower most portion of interior space 26 does not include a storage member. For example, the lower most portion of interior space 26 may only include a base, such as base 10 or the other bases disclosed herein. Such a lower most space/volume is defined by a bottom of body 4 of chest freezer 2 and a bottom of a lower most storage member, such as storage member 18. According to embodiments of the present disclosure, such a lower space/volume may comprise at least a portion of any of the quadrants so that these lower spaces/volumes do not include any storage members, such as storage member 18. According to the preferred embodiments of the present disclosure, the percentage of the total volume of a particular quadrant that comprises such a lower space/volume that is free of storage members, such as storage member 18, may be at low as 15%, but is preferably at least 25%.

Also contemplated is a method for operating an organizer (e.g., organizers 20, 69, 80, 130, 180, 190) for a top-opening chest freezer (e.g., chest freezer 2) that has an interior space (e.g., interior space 26) sized to receive frozen items (e.g., frozen items 7, 8). This method includes, in no particular order, (1) providing a top-opening chest freezer 2, (2) providing an organizer 20 including a base 10, a vertical member 12 extending vertically from base 10, and a storage member 18 coupled to vertical member 12 and configured to store frozen items, (3) opening a lid 6 of chest freezer 2 to provide access to an upper portion of interior space 26 including uppermost storage member(s) 18, (4) sliding or moving storage member 18 vertically relative to base 10, and (5) rotating the storage member 18 horizontally relative to base 10 to expose space underlying storage member 18 that was unexposed prior to movement of storage member 18. After rotation, a majority of a storage member, such as storage member 18, may be positioned beyond the right or left walls of body 4 of chest freezer 2 with a vertical member, such as vertical member 12, keeping the storage member from falling down.

This method can also include a step of resting storage member 18 on a side/upper lip 3 of top-opening chest freezer 2 after rotating storage member 18 horizontally relative to base 10. Alternatively, the method can include a step of resting storage member 18 on at least one frozen item positioned within top-opening chest freezer 2 after rotating storage member 18 horizontally relative to base 10. This method for operating organizer 20 can also include locking storage member 18 in place on vertical member 12.

The exposed space may include additional storage members as disclosed herein. Thus, exposing the exposed space may provide access to frozen items positioned in the additional storage members. While storage member 18 is moved to a position exposing previously unexposed space, a user can retrieve frozen items 7 from the exposed space, such as from an underlying storage member. Normally, when user moves storage member 18 out of interior space 26 to rest on lip 3, the user does not remove frozen items 7 from within storage member 18, but does remove (or add) frozen items to the exposed space.

If necessary, a user can remove additional storage members to expose a lower portion, often the bottom portion, of interior space 26. The additional storage member may rest on lid 3 or be completely removed from interior space 26. When additional storage members are moved/removed, a user can remove (or add) frozen items to the newly exposed portion of interior space 26. After such removal, the additional storage members are returned to their stored location, blocking access to the lower portion of interior space 26. Similarly, the uppermost storage member 18 is rotated back above interior space 26 and lowered into interior space 26. The user then closes lid 6.

Though this method has been described in regards to organizer 20 and chest freezer 2, this method can also apply to other embodiments of this disclosure.

The invention claimed is:

1. A chest freezer assembly comprising: including:

a chest freezer for storing food items therein, the chest freezer having a body defining a bottom and side walls, and a lid, the body and the lid defining a first compartment having an interior space comprising first and second interior portions that are adjacent the bottom of the chest freezer, and third and fourth interior portions that are above the first and second interior portions, respectively, the lid being coupled to the body to rotate about a horizontal axis of rotation positioned adjacent a back of the body of the chest freezer between a shut, lowered position which prevents access to the compartment and a raised, open position which allows access to the compartment; and a chest freezer organizer positioned in the interior space, the chest freezer organizer comprising:

a first base member comprising a first horizontal bar member and a first plurality of feet extending below the first horizontal bar member, wherein the first plurality of feet engage the bottom of the chest freezer to elevate and support the first horizontal bar member above the bottom of the chest freezer; first and second vertical members coupled to distal ends of first horizontal bar member respectively and extending upward from the bottom of the chest freezer within the interior space of the chest freezer, the first vertical member being disposed within the first and third interior portions of the interior space of the chest freezer, the second vertical member being disposed within the second and fourth interior portions of the interior space of the chest freezer;

a second base member comprising a second horizontal bar member and a plurality of second feet extending below the second horizontal bar member, wherein the second feet engage the bottom of the chest freezer to elevate and support the second horizontal bar member above the bottom of the chest freezer, wherein the second horizontal bar member has a top surface and the top surface is free from having any projections extending upwardly therefrom;

wherein the first and the second base members are spaced apart from each other and elevated above the bottom of the freezer at a generally level height;

first and second storage members resting on and extending between the first horizontal bar member and the second horizontal bar member and disposed in, respectively, the first and second interior portions of the chest freezer, wherein the first and second storage members define first and second chambers respectively which are each configured to store the food items therein; and third and fourth rectangular storage members defining third and fourth chambers respectively which are each configure to store the food items therein, wherein the third and fourth rectangular members each comprise four corners respectively, wherein a third vertical member is attached to a first corner of said four corners of the third storage member and extends below third storage member, wherein the third vertical member is tubular and has a diameter that is greater than a diameter of the first vertical member so that the first vertical member can fit within the third vertical member to enable the third storage member to move vertically and rotate relative to the first vertical member, the third storage member having a lowered position in which the third storage member is rotatably coupled to the first vertical member and disposed in the third interior portion of the chest freezer and a raised position in which the third storage member remains rotatably coupled to the first vertical member and is above the side walls of the chest freezer and rotated to provide access to the first storage member, the fourth storage member having a lowered position in which the fourth storage member is rotatably coupled to the second vertical member and disposed in the fourth interior portion of the chest freezer and a raised position in which the fourth storage member remains rotatably coupled to the second vertical member and is moved above the side walls of the chest freezer and rotated to to provide access to the second storage member.

2. The chest freezer assembly of claim 1, wherein the first, second, third, and fourth interior portions of the interior space are four quadrants of the interior space.

3. The chest freezer organizer of claim 1, wherein the first vertical member is positioned nearest the first corner of said four corners of the third storage member and the first vertical member is spaced apart from an apex of the first corner.

4. The chest freezer organizer of claim 1, wherein each base member of the chest freezer organizer and the bottom of the chest freezer organizer define storage space therebetween respectively to store the food items.

5. The chest freezer organizer of claim 1, wherein the first and second vertical members are positioned closer to the horizontal axis of rotation of the lid than to a front of the body of the chest freezer.

6. The chest freezer organizer of claim 1, wherein each of the third and fourth storage members in the raised positions thereof rest on a top surface of a corresponding side wall from said side walls of the body of the chest freezer respectively.

7. A chest freezer assembly comprising:

a chest freezer for storing food items therein, the chest freezer having a body and a lid, the body having a front, a back, and first and second side walls therebetween that define with the lid an interior space comprising a bottom, first and second quadrants that are side by side each other and adjacent the bottom of the chest freezer, and third and fourth quadrants that are side by side to each other and above the first and second quadrants, respectively, the lid being sized to completely cover a top of the body, the lid being coupled to the body to rotate about a horizontal axis of rotation positioned adjacent to the back of the body of the chest freezer between a shut, lowered position which prevents access to the interior space and a raised, open position which allows access to the interior space; and a chest freezer organizer positioned in the interior space of the body of the chest freezer, the chest freezer organizer comprising:

a first base member comprising a first horizontal bar member and a first plurality of feet extending below the first horizontal bar member, wherein the first plurality of feet engage the bottom of the chest freezer to elevate and support the first horizontal bar member above the bottom of the chest freezer to create storage space for the food items;

first and second vertical members coupled to distal ends of the first horizontal bar member respectively and extending upward from the bottom of the chest freezer within the interior space of the chest freezer, the first vertical member being disposed within the first and third quadrants of the interior space of the chest freezer, the second vertical member being disposed within the second and fourth quadrants of the interior space of the chest freezer;

a second base member comprising a second horizontal bar member and a plurality of second feet extending below the second horizontal bar member, wherein the second feet engage the bottom of the chest freezer to elevate and support the second horizontal bar member above the bottom of the chest freezer, wherein the second horizontal bar member has a top surface and the top surface is free from having any projections extending upwardly therefrom;

wherein the first and the second base members are spaced apart from each other and elevated above the bottom of the freezer at a generally level height;

first and second storage members resting on and extending between the first horizontal bar member and the second horizontal bar member and disposed in, respectively, the first and second quadrants of the chest freezer between the first and second vertical members;

wherein the first and second storage members define first and second chambers respectively which are each configured to store the food items therein; and third and fourth rectangular storage members defining third and fourth chambers respectively which are each configured to store the food items therein, wherein the third and fourth rectangular members each comprise four corners respectively, wherein a third vertical member is attached to a first corner of the four corners of the third storage member and extends below third storage member, wherein the third vertical member is tubular and has a diameter that is greater than a diameter of the first vertical member so that the first vertical member can fit within the third vertical member to enable the third storage member to move vertically and rotate relative to the first vertical member the third storage member having a lowered position in which the third storage member is rotatably coupled to the first vertical member and disposed in the third quadrant of the chest freezer and a raised position in which the third storage member remains rotatably coupled to the first vertical member and is above the side walls of the chest freezer and rotated to rest on the first side wall of the body of the chest freezer to provide access to the first storage member, the fourth storage member having a lowered position in which the fourth storage member is rotatably coupled to the second vertical member and disposed in the fourth quadrant of the chest freezer and a raised position in which the fourth storage member remains rotatably coupled to the second vertical member and is moved above the side walls of the chest freezer and rotated to rest on the second side wall of the body of the chest freezer to provide access to the second storage member.

8. The chest freezer organizer of claim 7, wherein at least one of the first and second vertical members is positioned closer to the horizontal axis of rotation of the lid than to the front of the body of the chest freezer.

9. The chest freezer organizer of claim 7, wherein the first and second vertical members are positioned closer to the back of the body of the chest freezer than to the front of the body of the chest freezer.

10. The chest freezer organizer of claim 7, wherein the first vertical member is positioned nearest to the first corner of the four corners of the third storage member and the first vertical member is spaced apart from an apex of the first corner.

11. A method of using the chest freezer assembly of claim 7, the method comprising the steps of:

moving the third storage member vertically relative to the first base member from the lowered position thereof to the raised position thereof while the third storage member remains rotatably coupled to the first vertical member; and rotating the third storage member horizontally in the raised position thereof so that the third storage member is located beyond the first side wall of the body of the chest freezer.

12. The method of claim 11, further comprising the step of: resting the third storage member on an upper lip of the first side wall of the body of the chest freezer.

13. The method of claim 11, further comprising the step of: providing the food items;

removing a food item from said food items in the first storage member while the third storage member rests on the upper lip of the first side wall of the body of the chest freezer.

14. The method of claim 11, further comprising the step of: providing the food items;

removing a food item from said food items in the storage space created by the first horizontal bar member and the bottom of the interior space of the chest freezer.

* * * * *